(12) United States Patent
Maas et al.

(10) Patent No.: US 6,364,172 B1
(45) Date of Patent: Apr. 2, 2002

(54) LIQUID DISPENSER AND ASSEMBLY METHODS THEREFOR

(75) Inventors: Wilhelmus Johannes Maas; Petrus Lambertus Hurkmans, both of Someren (NL)

(73) Assignee: AFA Polytek, B.V. (NL)

( * ) Notice: Subject to any disclaimer, the term of this patent is extended or adjusted under 35 U.S.C. 154(b) by 0 days.

(21) Appl. No.: 09/459,034

(22) Filed: Dec. 10, 1999

Related U.S. Application Data
(60) Provisional application No. 60/133,961, filed on May 13, 1999, provisional application No. 60/133,339, filed on May 10, 1999, provisional application No. 60/124,807, filed on Mar. 17, 1999, provisional application No. 60/123,222, filed on Mar. 8, 1999, and provisional application No. 60/123,045, filed on Mar. 5, 1999.

(30) Foreign Application Priority Data

| Dec. 10, 1998 | (NL) | 1010777 |
|---|---|---|
| Dec. 10, 1998 | (NL) | 1010778 |
| Mar. 5, 1999 | (NL) | 1011477 |
| Mar. 6, 1999 | (NL) | 1011479 |
| May 4, 1999 | (NL) | 1011962 |
| May 5, 1999 | (NL) | 1011964 |
| Sep. 24, 1999 | (NL) | 1013139 |

(51) Int. Cl.[7] .............................. B67D 5/40
(52) U.S. Cl. .................... 222/383.1; 222/340
(58) Field of Search .................. 222/383.1, 340, 222/321.7, 321.9, 385

(56) References Cited

U.S. PATENT DOCUMENTS

| 2,418,348 A | 4/1947 | Hermann | 222/493 |
|---|---|---|---|
| 2,579,156 A | 12/1951 | Parvis | 222/493 |
| 3,157,323 A | 11/1964 | Kitterman | 222/520 |

(List continued on next page.)

FOREIGN PATENT DOCUMENTS

| DE | 197 00 607 A1 | 1/1997 |
|---|---|---|
| EP | 0 286 608 A2 | 3/1988 |
| EP | 0 335 505 A1 | 3/1989 |
| EP | 0 475 546 A1 | 7/1991 |
| EP | 0 516 472 A1 | 5/1992 |
| EP | 0 557 714 A1 | 1/1993 |
| EP | 0 598 237 A2 | 10/1993 |
| EP | 0 710 507 A2 | 10/1995 |
| EP | 0 701 950 A2 | 3/1996 |
| EP | 0 750 947 A2 | 1/1997 |
| EP | 0 761 313 A2 | 3/1997 |
| EP | 0 850 695 A2 | 7/1998 |
| NL | 1010777 | 12/1998 |
| NL | 11010778 | 12/1998 |
| NL | 1011477 | 3/1999 |
| NL | 1011479 | 3/1999 |
| NL | 1011962 | 5/1999 |
| NL | 1011964 | 5/1999 |
| NL | 1013139 | 9/1999 |

*Primary Examiner*—Kevin Shaver
*Assistant Examiner*—Melvin A. Cartagena
(74) *Attorney, Agent, or Firm*—Lerner, David, Littenberg, Krumholz & Mentlik, LLP

(57) ABSTRACT

A liquid dispenser includes a dispenser subassembly having an inlet, an outlet, and a pump in fluid communication with the inlet and the outlet, the pump being movable between a first position and a second position. The liquid dispenser also has a container including an opening for receiving a liquid and an actuating element connected thereto. The actuating element is engagable with the dispenser subassembly when the container and the dispenser subassembly are assembled together. Engagement of the actuating element with the dispenser subassembly is a prerequisite for operating the pump and dispensing the liquid from the dispenser. Also disclosed is a method of priming a liquid dispenser during final assembly thereof whereby the liquid dispenser will be immediately ready to discharge a liquid without further priming, such as is required with conventional liquid dispensers. The dispenser may also have a precompression system that stops liquid from being discharged until a predetermined pressure level has been attained in a pump chamber.

85 Claims, 34 Drawing Sheets

U.S. PATENT DOCUMENTS

| | | | |
|---|---|---|---|
| 3,162,706 A | 12/1964 | Cheney | 264/525 |
| 3,336,425 A | 8/1967 | Valyi | 264/524 |
| 3,523,329 A | 8/1970 | Gallay | 53/561 |
| 3,738,545 A | 6/1973 | Roy | 222/525 |
| 4,120,430 A | 10/1978 | French | 222/234 |
| 4,129,235 A | 12/1978 | Haas | 222/321 |
| 4,457,455 A | 7/1984 | Meshberg | 222/105 |
| 4,489,861 A | 12/1984 | Saito et al. | 222/207 |
| 4,593,607 A | 6/1986 | Bennett | 92/130 B |
| 4,662,544 A | 5/1987 | Gillispie | 222/385 |
| 4,679,712 A | 7/1987 | Foster et al. | 222/384 |
| 4,691,849 A | 9/1987 | Tada | 222/382 |
| 4,978,037 A | 12/1990 | Schuckmann | 222/260 |
| 4,993,214 A | 2/1991 | Corba | 53/471 |
| 5,040,701 A | 8/1991 | Knickerbocker et al. | 222/153 |
| 5,158,211 A | 10/1992 | Meshberg | 222/153 |
| 5,201,726 A | 4/1993 | Kirkham | 604/294 |
| 5,207,359 A | 5/1993 | Steijns | 222/383 |
| 5,211,315 A | 5/1993 | Geier | 222/383 |
| 5,271,532 A | 12/1993 | Jumel et al. | 222/321 |
| 5,297,701 A | 3/1994 | Steijns et al. | 222/153 |
| 5,337,931 A | 8/1994 | Kitterman | 222/525 |
| 5,348,194 A | 9/1994 | Mascitelli et al. | 222/209 |
| 5,366,121 A | 11/1994 | Foster et al. | 222/383 |
| 5,425,477 A | 6/1995 | Montaner et al. | 222/383.1 |
| 5,471,821 A | 12/1995 | Lindgren | 53/452 |
| 5,553,752 A | 9/1996 | Foster et al. | 222/340 |
| 5,638,994 A | 6/1997 | Libit et al. | 222/207 |
| 5,641,097 A | 6/1997 | Renault et al. | 222/321.2 |
| 5,730,335 A | 3/1998 | Maas et al. | 222/341 |
| 5,746,728 A | 5/1998 | Py | 604/298 |
| 5,759,218 A | 6/1998 | Martin et al. | 55/385 |
| 5,788,125 A | 8/1998 | Steiner et al. | 222/331 |
| 5,803,318 A | 9/1998 | Lina | 222/321.2 |
| 5,839,616 A | 11/1998 | Irwin et al. | 222/321.8 |
| 5,845,819 A | 12/1998 | De Pous | 222/321.9 |
| 5,875,932 A | 3/1999 | Meshberg | 222/153.13 |
| 5,884,845 A | 3/1999 | Nelson | 239/333 |
| 5,938,082 A | 8/1999 | Foster et al. | 222/153.09 |
| 5,947,341 A | 9/1999 | Montaner et al. | 222/340 |

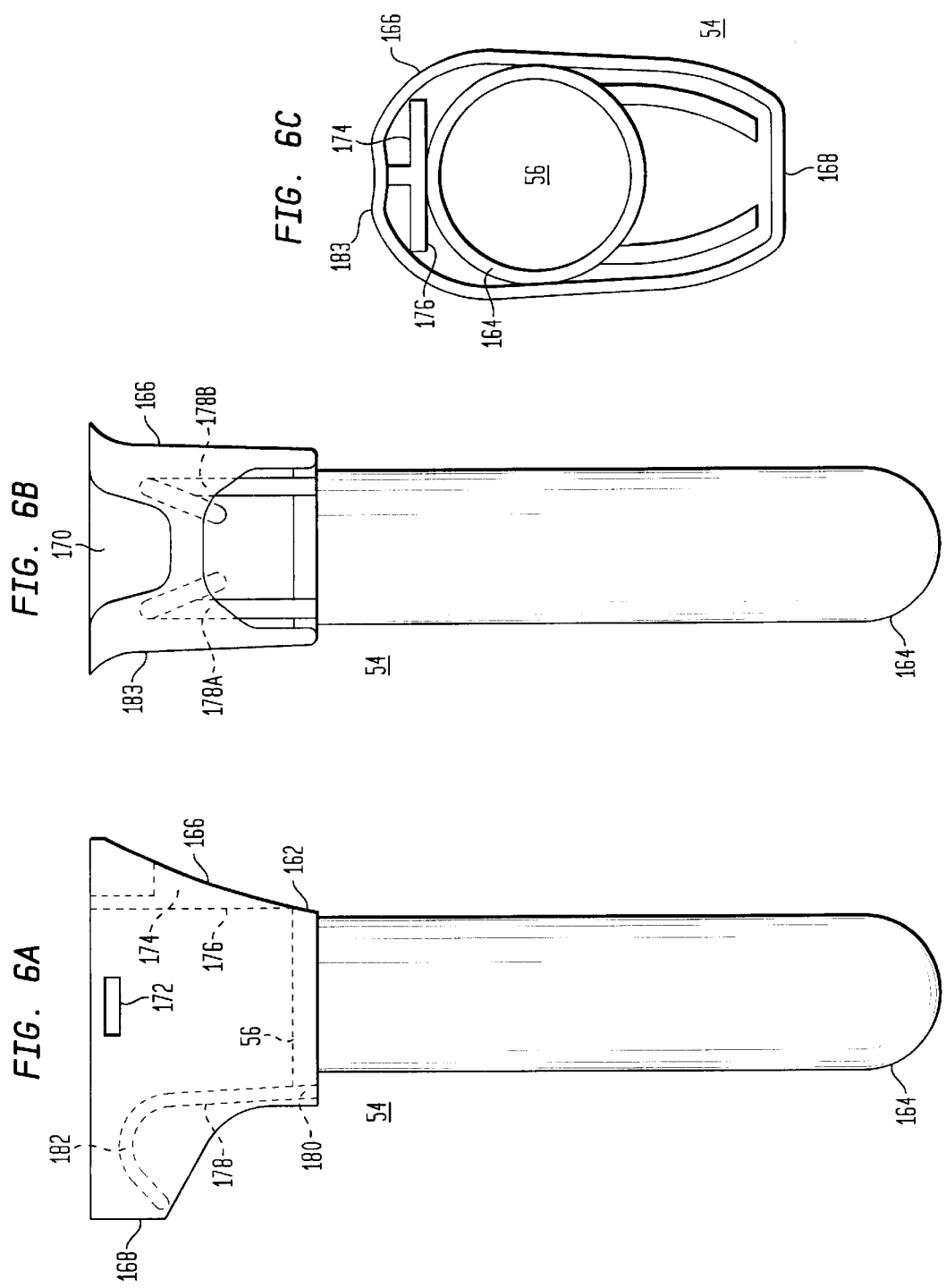

FIG. 46
FIG. 50
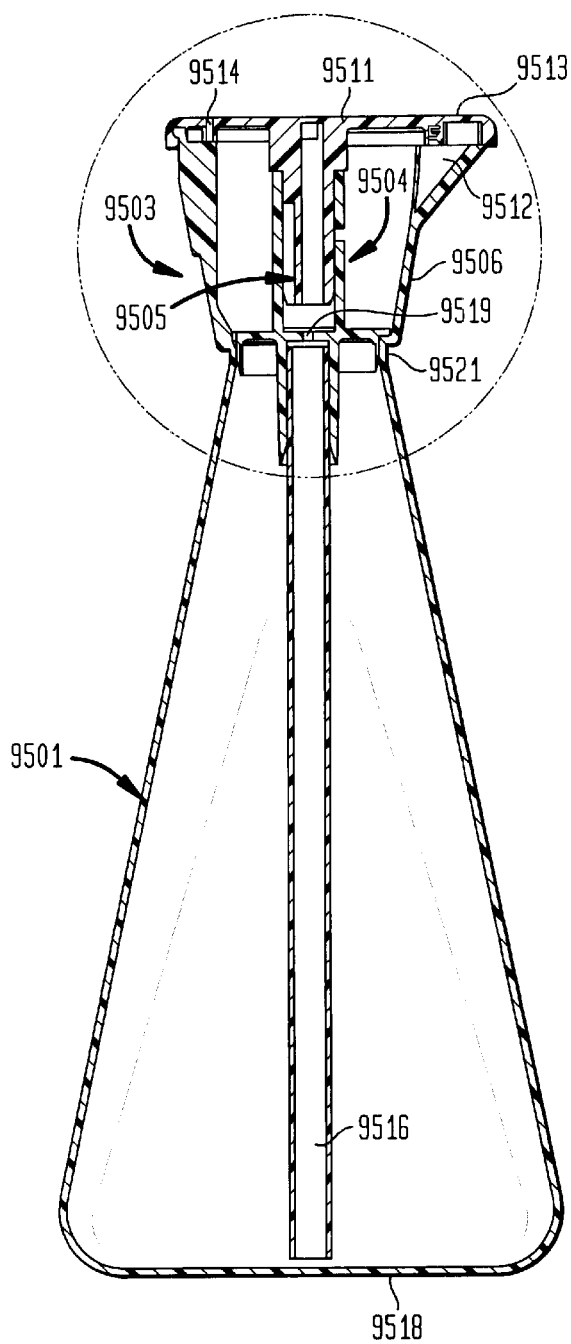
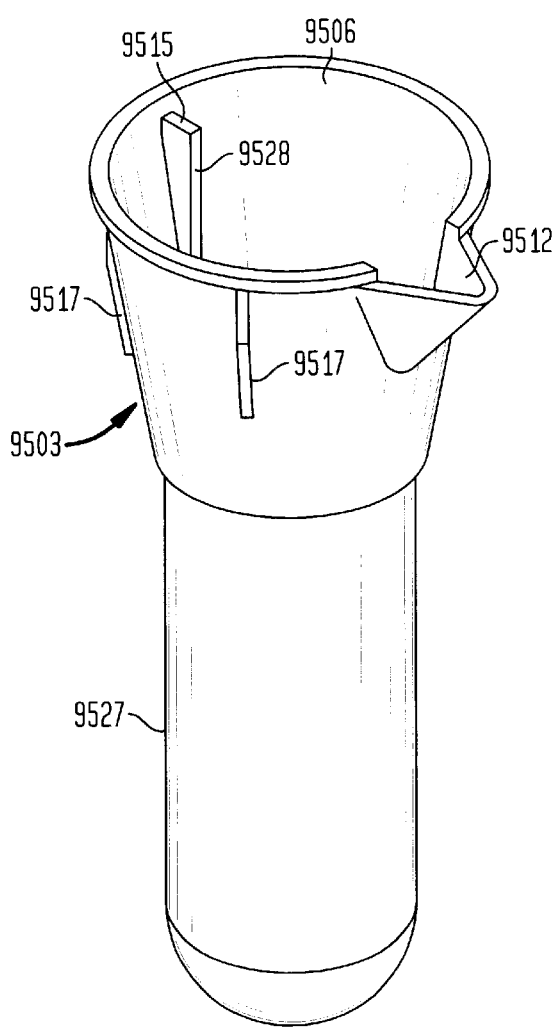

LIQUID DISPENSER AND ASSEMBLY METHODS THEREFOR

CROSS REFERENCE TO RELATED APPLICATIONS

The present application claims benefit under 35 U.S.C. Section 119 of Netherlands patent application Nos. 1010778 filed Dec. 10, 1998, 1010777 filed Dec. 10, 1998; 1011962 filed May 4, 1999; 1011964 filed May 5, 1999; 1011477 filed Mar. 5, 1999; 1011479 filed Mar. 6, 1999; and 1013139 filed Sep. 24, 1999. The present application also claims benefit under 35 U.S.C. Section 119 of the following U.S. Provisional applications that claimed benefit of one or more of the above-identified Netherlands patent applications: U.S. Provisional application Nos. 60/123,045 for "Precompression System" filed Mar. 5, 1999; 60/124,807 entitled "Precompression System II" filed Mar. 17, 1999; 60/123,222 entitled "Combination of a Sprayer Head and a Fluid Container and the Method of Manufacturing the Sprayer Head and the Fluid Container" filed Mar. 8, 1999; 60/133,339 entitled "Metering Device and Method of Manufacturing Same" filed May 10, 1999; and 60/133,961 entitled "Dosing Device for a Fluid" filed May 13, 1999. The disclosures of U.S. Provisional applications Nos. 60/123,045; 60/124,807; 60/123,222; 60/133,339 and 60/133,961 are hereby incorporated by reference herein.

FIELD OF THE INVENTION

The present invention relates to containers for liquids and more specifically relates to containers having dispenser subassemblies connected thereto for selectively dispensing liquids stored in the containers.

BACKGROUND OF THE INVENTION

Containers having dispenser assemblies secured thereto are well known. One conventional dispensing system includes a container or bottle having and opening with a removable cap. Typically, the cap is secured over the container opening by screwing the cap onto external threads formed on a neck of a bottle. The screw cap is typically formed as a separate item that is assembled from a number of components. In addition, external threads must be formed on the neck of the bottle. This requires sophisticated molds and molding techniques be used. As a result, conventional liquid dispensers have a large number of parts and assembly of the parts is complex.

Another type of liquid dispenser includes a sprayer bottle having a sprayer housing fixed onto the neck of a fluid container. The sprayer housing generally contains a manually operated pump having a suction side and a compression side. An operating element, such as a trigger, is typically pivotally connected to the pump for operating the pump. A dip tube may extend from the suction side of the pump and into the container so that the liquid in the container may be drawn through the dip tube and into the pump during operation thereof. The trigger sprayer also includes an outlet in fluid communication with the compression side of the pump for discharging the liquid or fluid. The trigger sprayer typically includes a spring located in the pump for biasing the piston of the pump to return to a is charged position at the end of a discharging pump stroke.

Most trigger sprayers are connected to containers by providing the sprayer with an internally threaded ring and forming external screw threads on the container, preferably at a neck portion of the container. As such, the trigger sprayer is assembled with the container by screwing the trigger sprayer onto the external threads of the container. The need for forming internal and/or external threads adds significant cost to the manufacture and assembly of such dispensers. Manufacturing costs are typically increased because more complicated molding techniques and molds must be used to form threads in the molded components. Assembly costs are increased because sophisticated equipment and/or additional personnel must be used to screw the trigger sprayer onto the external threads of the container.

Thus, the present invention provides a method of making a liquid dispenser that has many advantages over conventional methods. In conventional methods, the container or bottle is typically formed at a first location such as by means of blow molding, and is then fed to a filling line. The bottle typically includes a fixing means such as screw threads provided in the vincinity of the bottle opening or a neck portion thereof. A filling head which is typically assembled at another location is then screwed on to the external threads provided on the neck of the bottle. At the filling line, the bottle is filled and the cap is screwed onto the external threads. This conventional method of filling and assembling bottles requires a relatively large number of operations that are not well integrated with one another so that the assembly process is both time consuming and expensive. In addition, all of the component parts for the final assembly must be formed well before final assembly of the container which results in high inventory costs. Moreover, once the containers have been formed, the empty containers take up a relatively large amount of space during transport to a filling station.

Prior art dispensing devices of the type described above generally have a high number of parts resulting in a product that is both difficult to manufacture and assemble. As a result, both the manufacturing and the assembly of the dispenser parts are expensive and time consuming. This expense and time factor is multiplied by the wide variety of trigger sprayers and containers that are commonly produced. In addition, the various trigger sprayers are often made of different materials, thereby posing problems in handling and recycling the trigger sprayer and the container when the items are ready to be discarded. For example, most, if not all, prior art trigger sprayers employ a metal spring in the pump chamber for returning the trigger to a charged position. As a result, the metal spring must be removed from the trigger sprayer before the plastic portion of the item may be recycled.

Another problem noted with conventional dispensers is that they are ill suited for dispensing consistent doses of fluid each time they are actuated. In response to this problem, commonly assigned U.S. Pat. No. 5,730,335 discloses a precompression system for a dispensing device that prevents liquid from leaving a discharge nozzle of the dispenser at too low a pressure, which would result in insufficient atomization of the liquid with large drops of fluid or liquid being formed in the spray pattern. The precompression system includes a precompression valve moveable between a position that closes off communication between a pump chamber and a discharge nozzle and an open position in which it is spaced from a valve seat for opening communication between the pump chamber and the discharge nozzle. The precompression valve is biased toward a closed position by a spring element. The precompression valve is moved to its open position only when a predetermined pressure is attained within the pump chamber.

One known problem associated with certain precompression systems is that the valve is arranged in line with the pump chamber. Therefore, it is difficult to design this type of precompression system using injection-molding processes. Furthermore, because the valve is in line with the pump chamber of the dispenser housing, the resulting design is relatively bulky, making it difficult to incorporate the precompression feature into compact dispenser housing assemblies and making assembly of such devices complex, costly and time-consuming.

SUMMARY OF THE INVENTION

The present invention relates to various types of liquid dispensers and is assembly methods for making such dispensers that overcome the problems described above.

In accordance with certain preferred embodiments of the present invention, a liquid dispenser includes a container having an opening for receiving and dispensing a liquid and a dispensing head having an outlet and a closing member that cooperates with the outlet. The closing member of the dispensing head is moveable between a first position wherein the closing member closes the container opening so that no liquid may pass from the outlet and a second position wherein the closing member is remote from the container opening so that liquid may be dispense from the outlet. In hightly preferred embodiments, at least part of the dispensing head is preformed on the container and a remaining part of the dispensing head is later assembled therewith to provide an operational liquid dispenser. In other words, at least a portion of the dispensing head is connected to the container before the remaining part of the dispensing head is assembled therewith.

The container preferably includes a shroud or neck portion integrally formed therewith. The neck is preferably provided at an opening of the container. In certain embodiments, the at least part of the dispensing head preformed on the container is provided at the neck of the container. The at least part of the dispensing head may include a retaining element, such an one or more internal grooves formed in the neck, for securing and/or holding the closing member of the remaining part of the dispensing head in the neck. The retaining element preferably allows the remaining part of the dispensing head to selectively move between a first closed position in which no liquid may be dispensed and a second open position wherein liquid may be dispensed from the container.

The remaining part of the dispensing head assembled with the container preferably includes a snap coupling, such as an external rib, engagable with the internal grooves in the neck of the container. The snap coupling enables the remaining part of the dispensing head to be assembled with the neck of the container, or to the part of the dispensing head preformed thereon, in a relatively quick and simple single movement.

The at least part of the dispensing head preformed on the neck may also include a biasing element, such as one or more springs, for urging the closing member of the remaining part of the dispensing head into the first closed position or the second dispensing position. The remaining part of the dispensing head may also include a pump positioned between the container and the outlet of the remaining part of the dispensing head.

Thus, certain preferred embodiments of the present invention provide a liquid dispenser wherein at least a part a dispensing head is preformed on a container and the remaining part of the dispensing head is connected thereto for selectively dispensing a liquid from the container. Preforming at least part of the dispensing head on the container before final assembly reduces the number of separate parts that are needed to manufacture a liquid dispenser and simplifies final assembly of such a liquid dispenser. In addition, the remaining part of the disensing head may be made of a lighter material and/or simpler structure because the dispensing head derives at least part of its strength and ridigity from the container.

In further preferred embodiments, a handle may be connected with the container. In highly preferred embodiments, the handle is integrally connected with the container. The handle enables relatively large containers, such as kegs of beer or wine, to be easily handled and moved from one location to another.

In certain preferred embodiments, the container includes a flat annular surface facing the bottom of the container. The flat annular surface may be located at an underside of the neck and provides an area for securing the container when the liquid dispenser in formed, filled and assembled with the dispensing head. As a result, the container may be suspended in air, with no need for a support surface, during forming, filling and assembly of the container. As a result, a machine used for filling the liquid dispenser of the present invention does not have to be modified or changed every time containers having different sizes, shapes or volumes must be processed therethrough.

In other preferred embodiments of the present invention, a method of making a liquid dispenser having a container and a dispensing head includes forming the container, forming at least part of the dispensing head on the container, forming the remainding part of the dispensing head having an outlet and a closing member, filling the container with a liquid and assembling the remaining part of the dispensing head with the container to provide an operational liquid dispenser. The container preferably comprises a resiliently deformable thermoplastic material that is formed by first injection molding a container preform and then blow molding the container into a final desired shape. After the container has been blow molded, it is preferably filled with a liquid. The container preferably includes a neck portion with at least part of the dispensing head formed either on the container on within the neck portion.

In other preferred embodiments of the present invention, a liquid dispenser includes a dispenser subassembly having an inlet, an outlet, and a pump in fluid communication with the inlet and the outlet, the pump being movable between a first position and a second position. The liquid dispenser also preferably includes a container having an opening and an actuating element connected thereto. The actuating element is desirably engagable with the dispenser subassembly when the container and the dispenser subassembly are assembled together. In certain preferred embodiments, engagement of the actuating element with the dispenser subassembly is a prerequisite for operating the pump and dispensing the liquid from the dispenser.

The actuating element is preferably connected to the container adjacent the opening of the container, such as being integrally connected to or integrally molded to the container. The container and the actuating element may be made of a polymer, such as a resilient thermoplastic material. The actuating element may include a biasing element, such as one or more flexible springs, engagable with the dispenser subassembly for urging the pump of the subassembly into one of the first and/or second pump positions. In certain embodiments, the container has a longitudinal axis and the biasing element extends in a direction substantially parallel to the longitudinal axis. In these embodiments, the biasing element includes two legs having first ends connected to the container and second ends remote therefrom, the legs having intermediate sections extending away from the opening of the container and the second ends of the legs including a curved portion, such as an inverted U-shaped section. The two legs of the biasing element may be substantially parallel to one another. In still other preferred embodiments, the biasing element extends in a direction substantially perpendicular to the longitudinal axis, such as one or more flexion springs connected to the container.

The container of the present invention preferably has an opening for receiving a liquid, such as a cleaning solution or a high viscosity gel. The container is preferably a thermoplastic preform that is fabricated using injection-molding techniques. The preform may be blow molded into a container having a desired shape immediately before the container in filled with a liquid and assembled with one of the dispenser subassemblies of the present invention. The container desirably includes a shroud extending away from and at least partially surrounding the opening. The shroud is desirably engagable with the dispenser subassembly when the dispenser subassembly and the container are assembled together. The shroud preferably has an inner dimension or shape that substantially coincides with the outer dimension of the dispenser subassembly and/or the housing. The shroud may include an exterior surface having a grippable surface that is sized and shaped to fit a user's hand when a user desires to use the liquid dispenser of the present invention. The shroud preferably includes an interior surface that may surround the biasing element connected to the container and/or the container opening. The interior surface of the shroud, as will be described in more detail below, also includes at least one element that is essential for operating the dispenser subassembly for discharging liquid from the dispenser. As such, either the interior surface or the exterior surface of the shroud, or both, may serve as the actuating element for the dispenser of the present invention. As used herein, the term actuating element means a part that cooperates with or engages the dispenser subassembly for operating the subassembly and the liquid dispenser. The liquid dispenser will generally not operate unless the actuating element engages the dispenser subassembly.

In certain embodiments, the shroud includes a lower end integrally connected with the container adjacent the opening and an upper end remote therefrom. The shroud may also include a front section, a rear section and two side sections extending between the front and the rear. The front of the shroud may be adjacent the biasing element and the rear of the shroud remote therefrom. The sides of the shroud may include one or more slots extending between the interior surface and the exterior surface of the shroud. The slots are sized to receive one or more tabs extending from the housing so that the housing may be snap-fit into the shroud during assembly of the container and the dispenser subassembly.

In highly preferred embodiments, neither the dispenser subassembly nor the container have threads and the dispenser subassembly is not screwed onto the container. As a result, molding techniques for making the component parts may be greatly simplified and there is no need for sophisticated molding devices typically used to form threads in molded parts. This results in a dramatic savings in manufacturing costs. In addition, assembly of the liquid dispenser is simpler because the dispenser subassembly is not screwed onto the container. This greatly reduces assembly costs.

In certain preferred embodiments, the dispenser subassembly includes a housing, preferably made on a thermoplastic material, having the inlet for drawing the liquid into the housing and the outlet for discharging the liquid from the housing. The housing may also have a front, a rear, two lateral sides extending between the front and the rear, an upper end and a lower end. The lower end of the housing generally has a base, such as a circular base, sized and adapted for being secured within the opening of the container. The base may be substantially circular and include an opening for the inlet for liquid into the housing. The housing desirably includes the pump comprising a pump chamber having a first open end facing the front of the housing, a second substantially closed end remote therefrom, and an interior wall extending between the first and second ends thereof. The interior wall has substantially cylindrical shape when viewed in cross-section. The pump also includes a piston movable between the first and the second ends of the pump chamber. The piston may include a piston rod having first and second annular sealing elements adapted for engaging the interior wall of the pump chamber.

The housing of the dispenser subassembly may include one or more peripheral tabs and, as mentioned above, the shroud includes one or more slots sized to receive the tabs so that the dispenser subassembly may be reliably secured to the shroud and the contaner. The housing may also include a top having a substantially flat upper surface that is adapted for receiving indicia, such as writing or a label indicating the type of liquid and/or product stored in the container. The flat upper surface of the container preferably comprises the uppermost portion of the container. The flat upper surface may facilitate stacking of multiple containers atop one another during shipping or storage. In other embodiments, the top of the dispenser subassembly lies in substantially the same plane as the upper edge of the shroud.

A movable element or member may be connected to the piston for moving the piston between the first and second ends of the pump chamber, whereby the actuating member engages the movable member when the dispenser subassembly and the container are assembled together for urging the movable member and the piston toward the first pump position. In certain embodiments, the movable member includes a trigger having an upper end, a lower end and a mid-section between the upper and lower ends. The upper end of the trigger may be hingedly connected to the housing while the mid-section of the trigger may be pivotally connected to the piston. The trigger preferably includes an aperture between the mid-section and the upper end thereof, whereby the outlet of the housing, and any nozzle rotatably secured to outlet, may extend through the trigger aperture when the trigger is connected to the housing. The trigger may have a rear surface with one or more channels formed therein for engaging the actuating element during assembly of the liquid dispenser with the container, whereby the actuating element urges the trigger and the piston pivotally connected therewith toward the first pump position. The nozzle may be rotated for changing the shape of a spray discharged from the liquid dispenser and/or for locking the dispenser from dispensing any liquid whatsoever.

In certain preferred embodiments, the liquid dispenser includes a precompression system that is operable for allowing liquid entering the inlet to reach the outlet only after a predetermined pressure is established in the pump chamber. The precompression system stops the liquid from reaching the outlet when the pressure in the pump chamber falls below the predetermined pressure. The precompression system preferably includes a valve chamber formed in the housing having a first end facing the rear of the housing, a second end remote therefrom, and an interior wall extending between the first and second ends thereof. The second end of the valve chamber desirably includes an end wall having a valve seat and an opening extending through the center of the valve seat. The end wall at the second end of the valve chamber also preferably includes at least one relatively small opening therein that extends to the pump chamber for providing fluid communication between the pump chamber and the valve chamber.

The precompression system may include a spring valve having a first end including a flexible diaphragm engagable with the valve seat, a second end remote therefrom and an exterior sleeve extending between the first and second ends. The exterior sleeve of the valve is preferably engagable with the interior wall of the valve chamber. The flexible diaphragm at the first end of the valve preferably includes a convex surface facing the valve seat and a concave surface facing away from the valve seat. The flexible diaphragm and particularly the convex face thereof, is engagable with the valve seat and normally closes the opening in the valve seat. The diaphragm is preferably in substantial alignment with the outlet of the housing. In embodiments where the container includes a shroud, it is desirable that an interior surface of the shroud engage the dispenser subassembly when the dispenser subassembly and the container are assembled together so that the interior surface of the shroud, and preferably a substantially flat surface connected and/or integrally molded with the shroud, may engage and/or contact the second end of the spring valve for securing the spring valve within the valve chamber. The flat surface in contact with the second end of the valve prevents the spring valve from backing out of the valve chamber during operation of the dispenser. The dispenser would not operate without the inner surface of the shroud engaging the valve.

The housing may include a liquid supply opening between the inlet and the pump chamber that supplies fluid communication there between. In these embodiments, the liquid supply opening extends through the interior wall of the valve chamber and the spring valve includes the exterior sleeve engaging the interior wall of the valve chamber for affecting the flow of the liquid into the pump chamber. The spring valve may include a peripheral flap projecting from the first end of the valve wherein the peripheral flap covers the liquid supply opening between the liquid inlet and the pump chamber. The peripheral flap may be flexible and incline toward the interior wall of the valve chamber. The peripheral flap preferably seals the liquid supply opening when the piston moves from the first charged position to the second discharged position and opens the liquid supply opening when the piston moves from the second position to the first position. In other words, the peripheral flap is movable away from the liquid supply opening when the piston moves from the second position to the first position so that the liquid may be drawn into the pump chamber and engages the interior wall of the valve chamber during a discharge stroke When the spring valve is seated in the valve chamber, the flexible diaphragm of the spring valve preferably has a convex face in contact with the valve seat and in fluid communication with the pump chamber, whereby the convex face is forced away from the seat valve opening when the pressure within the pump chamber is greater than the combined force of the diaphragm and the ambient pressure cavity. The diaphragm is preferably dome-shaped and may includes a stop member integrally formed with the diaphragm on the concave face or surface thereof. The stop member prevents the diaphragm from flexing too far toward the second end of the valve that the diaphragm becomes invented.

The precompression system of the present invention provides many advantages over conventional liquid dispensers, such as trigger sprayers. With a standard trigger sprayer, as the pressure is building up or decreasing, there will be drips in the pattern that is being sprayed from the trigger sprayer at the beginning of the stroke and near the end of the stroke. When using a precompression valve in accordance with preferred embodiments of the present invention, there is no flow and no drips at the start of the stroke and, when the valve assembly opens, there is a sufficiently high pressure so that there is no immediate spray pattern from the outlet orifice in the nozzle until the pressure in the pumping chamber decreases to a predetermined value where the precompression valve assembly closes and again there is no flow or drips from that point to the end of the stroke of the piston. On release of the trigger and while the piston is moving under the force of the spring to its at rest position during the return stroke of the piston, the valve assembly is closed and there is no flow or drips.

In other embodiments, the liquid dispenser is designed for dispensing specific doses or metered amounts of a liquid, such as a liquid soap or gel. In these embodiments, the housing of the dispenser subassembly includes the pump chamber and a vent chamber adjacent the pump chamber. The liquid dispenser includes a movable element having a first piston and a second piston integrally connected thereto, wherein the first piston has an outer dimension sized for closely engaging an internal wall of the pump chamber and the second piston has an outer dimension sized for closely engaging an internal wall of the vent chamber. The movable element is movable between a first position and a second position, wherein the movable member is closer to the container in the second position than in the first position. The dispenser may also include a locking element cooperating with the movable element for blocking movement of the movable element toward the second pump position. The locking element may include a frangible tongue connected with the liquid outlet and/or a cover for selectively closing the outlet.

During operation, the liquid dispenser of the present invention is preferably in a charged or primed state when the piston is at the first end of the pump chamber and in a discharged or expended state when the piston is at the second end of the pump chamber. When the liquid dispenser is connected to a container, the is liquid is preferably drawn into the pump chamber when the piston moves from the second position to the first position and is preferably discharged from the pump chamber when the piston moves from the first position to the second position.

In further preferred embodiments, the pump chamber has a central axis located between the inlet and the outlet. The housing also desirably includes a valve chamber between the pump chamber and the outlet, whereby the valve chamber has a central axis and is in fluid communication with the pump chamber. Although the central axes of the pump chamber and the valve chamber are substantially parallel to one another, the two chambers are not in linear alignment with one another. In other words, the central axis of the pump chamber is offset from the central axis of the valve chamber.

In still other preferred embodiments, a liquid dispenser includes a dispenser subassembly and a container subassembly assembled therewith, whereby the container subassembly includes integral therewith a portion of the housing of the dispenser subassembly. In other words, the container subassembly is adapted to cooperate with and form at least a portion of the housing for the dispenser subassembly when the dispenser subassembly and container subassembly are assembled together. In these embodiments, the actuating element may be connected with the dispenser subassembly before the dispenser subassembly and the container are connected together. As a result, the actuating element is not preassembled with the container before the dispenser subassembly and the container are assembled together. However, in other preferred embodiments, the actuating element may be connected to the container so that the actuating element is engagable with the dispenser subassembly when the container subassembly and the dispenser subassembly are in their assembled configuration.

Other preferred embodiments of the present invention provide a liquid dispenser for measuring and dispensing of a precise dose of a liquid. The dosing device, which enables one to dose liquids in a simple manner and with great accuracy, can be used to administer food or medication to animals and/or to measure precise amounts of liquids, such as cleaning agents. The liquid dispenser includes a container for storing the liquid, and a dosing member integrally formed with the container. The container preferably has an opening for filling and dispensing a liquid. The liquid dispenser also includes a feed member in fluid communication with the container having at least one outlet opening,. The dosing member includes a substantially cylindrical hollow tube having at least one opening extending through a sidewall of the tube. The openings are preferably arranged at different heights and at different peripheral regions. The dosing member is preferably fixedly secured within the dosing chamber so that it does not rotate relative to the dosing chamber. The feed member is substantially cylindrical in shape and is connected to a dip tube placed into the container for drawing liquid from the container. The feed member and the dosing member are preferably rotatable relative to each other in order to determine one or more precise doses of liquid to be dispensed from the container.

The container and the dosing chamber are connected together, and in highly preferred embodiments preform may later be blow molded into a container having a predetermined size and shape, preferably just before the container is filled with a liquid and before final assembly of the liquid dispenser.

In certain embodiments, the dosing member is fixed in the dosing chamber and the feed member is rotatably connected with the dosing chamber. The dosing member is preferably mounted on a bottom of the dosing chamber, and may be integrally formed with the bottom of the dosing chamber. The liquid dispenser also preferably includes a cover that is snap fit atop the dosing chamber for at least partially enclosing the dosing chamber. The feed member may be connected to the cover and in certain embodiments may be integrally formed with the cover. The cover preferably includes at least one venting aperture for selectively venting the dosing chamber to atmosphere. In certain embodiments, the dosing chamber includes a cammed surface engagable with the at least one venting aperture for closing the at least one venting aperture. The cover may be rotatable relative to the dosing chamber and the dosing member for selectively opening and closing the at least one venting aperture.

During a dispensing operation, the cover may be rotated to place the channel of the feed member in registration with one of the outlet openings of the dosing member. Once one of the outlet openings of the dosing member is aligned with the chamber of the feed member, a fluid path is established that extends from the container, through the dip tube, through the feed member, through the dosing member and into the dosing chamber. The container may then be squeezed so that the liquid is pushed in an upward direction through the dip tube, through the channel of the feed member, through one of the outlet openings of the dosing member and into the dosing chamber. After a sufficient amount of liquid has been squeezed into the dosing chamber, the pressure applied to the container is released. When the squeeze pressure on the container is removed, at least some of the liquid in the dosing chamber will be suctioned back into the container. At least some of the liquid will return to the container until the liquid level in the dosing chamber drops to the level of the outlet of the dosing member in registration with the channel of the feed member. So long as the operational outlet opening of the dosing tube is above the liquid level in the dosing chamber, no further liquid will be returned to the container through that outlet. The outlet opening that is selected for being placed in registration with the channel of the feed member will thus determine the exact amount of liquid that will remain in the dosing chamber after pressure on the container is released. The amount of liquid remaining in the dosing chamber is desirably the precise amount by a user. The liquid can be dispensed from the dosing chamber of the container preferably, through a spout integrally formed with the sidewall of the dosing chamber.

The present invention also includes a method of priming or charging a liquid dispenser during final assembly thereof including providing a dispenser subassembly having an inlet, an outlet, and a pump in fluid communication with the inlet and the outlet, the pump being movable between a first position and a second position, and then providing a container having an opening for receiving a liquid and an actuating element connected thereto, the actuating element being engagable with the dispenser subassembly when the dispenser subassembly and the container are assembled together. The pump of the dispenser subassembly is then positioned in the second position. The container may then be formed, filled with a liquid and assembled with the dispenser subassembly. During the final assembling step, the actuating clement connected to the container engages the dispenser subassembly for moving the pump into the first pump position so as to draw the liquid into the pump. The dispenser subassembly preferably includes a movable element in contact with the pump for moving the pump between the first and second pump positions, wherein the actuating element engages the movable element during the assembly step for moving the pump from the second pump position to the first pump position.

BRIEF DESCRIPTION OF THE DRAWINGS

FIG. 6A shows a side view of the container shown FIG. 1.

FIG. 6B shows a front view of the container shown in FIG. 6A.

FIG. 6C shows a top view of the container shown in FIGS. 6A and 6B.

FIG. 46 shows a cross-sectional view of the liquid dispenser of FIG. 45 after the dosing device has been assembled with the container.

FIG. 50 shows a top perspective view of the container and the dosing chamber when the container is in a preformed state.

DETAILED DESCRIPTION OF PREFERRED EMBODIMENTS

Figure 1:
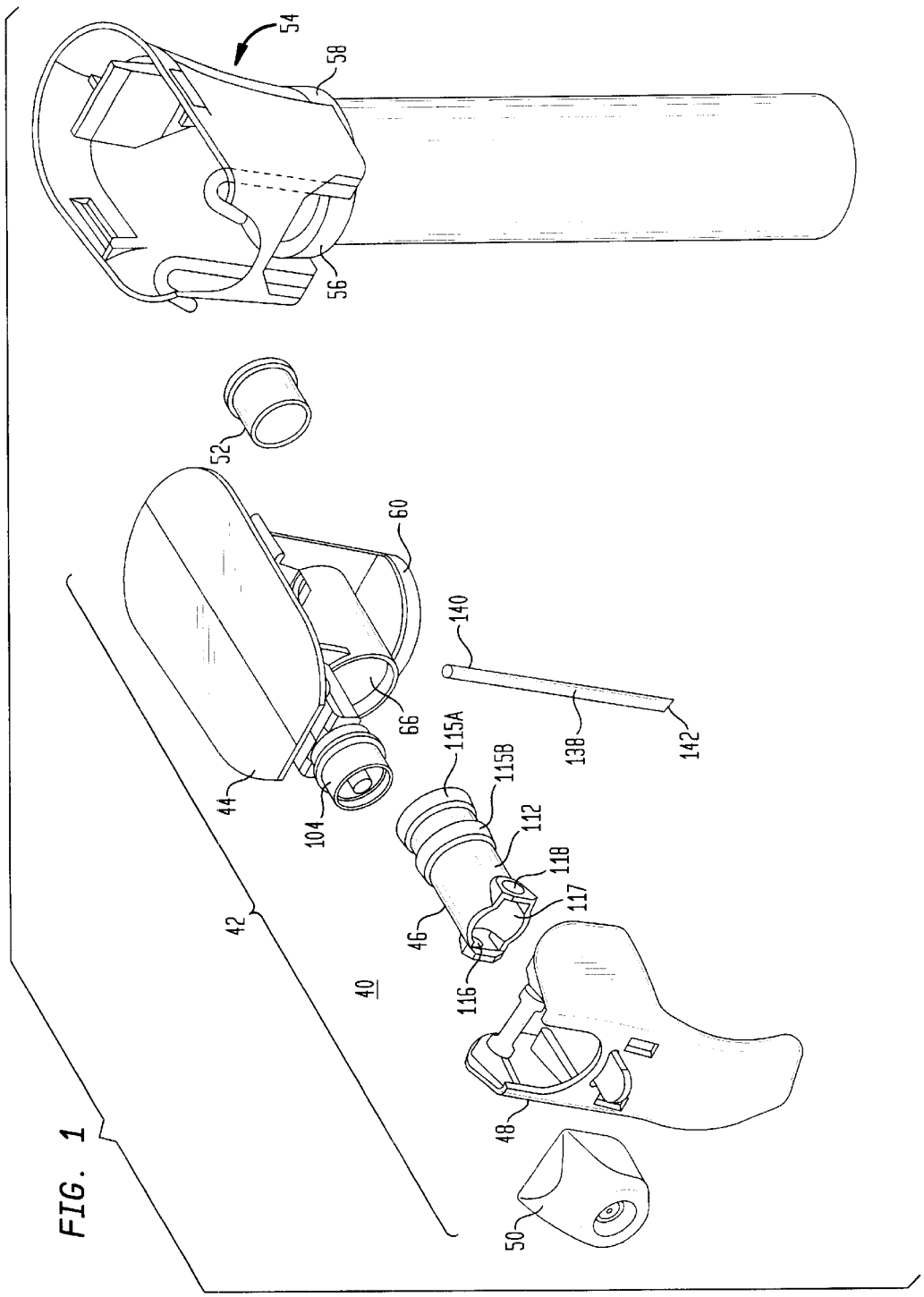
FIG. 1 shows an exploded view of a liquid dispenser including a container and a dispenser subassembly having a housing, a piston, a trigger, a nozzle and a valve, in accordance with certain preferred embodiments of the present invention.

FIG. 1 shows an exploded view of a liquid dispenser 40 in accordance with one preferred embodiment of the present invention. The liquid dispenser 40 includes a dispenser subassembly 42 including housing 44, a piston 46, a trigger mechanism 48, a discharge nozzle 50 and a valve 52. The liquid dispenser 40 also includes a container 54 having an opening 56 at an upper end 58 thereof for at least partially securing the dispenser subassembly 42 therein.

Figure 2A:
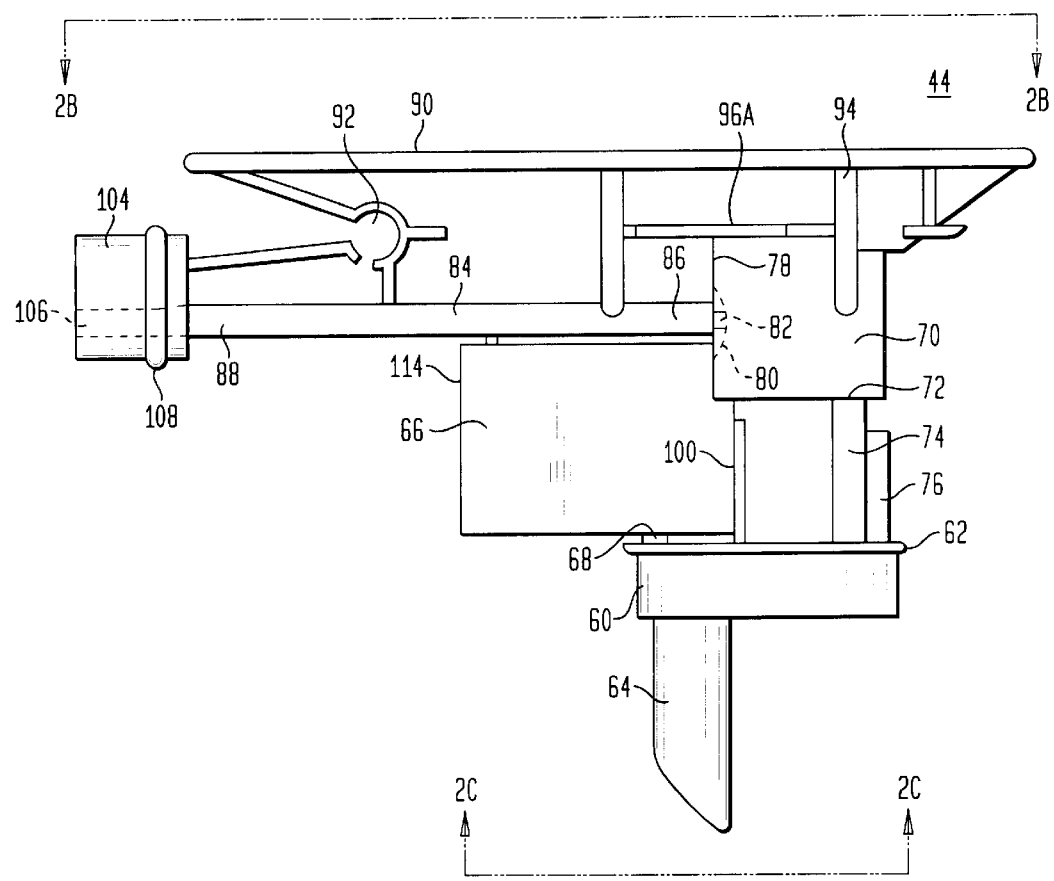
FIG. 2A shows a side view of the housing of FIG. 1 including a pump chamber and a valve chamber.

Referring to FIGS. 1 and 2A, the housing 44 of the dispenser subassembly includes a circular base 60 sized to fit within the opening 56 of the container 54. The circular base 60 includes an annular flange 62 at an upper end thereof for creating a fluid-tight seal between the circular base 60 and the container opening 56. The housing 44 also include two alignment legs 64 projecting from an underside of the circular base 60. The two alignment legs 64 guide the movement of the housing 44 into the opening 56 of the container 54 during an assembly process, as will be described in more detail below.

Referring to FIGS. 1 and 2A, the housing 44 includes a pump comprising a pump chamber 66 in fluid communication with the underside of the circular base 60 via an aeration orifice 68 extending between the pump chamber 66 and the circular base 60. As will be described in more detail below, after the dispenser subassembly has been attached to the container the aeration orifice prevents a vacuum from developing within the container during operation of the liquid dispenser. The lousing also includes a valve chamber 70 having an internal wall with a substantially cylindrical shape. The valve chamber 70 has a liquid supply opening 72 at a bottom section of the internal wall that is in alignment with a liquid supply passage 74 extending between the valve chamber 70 and the underside of the circular base 60. The liquid supply passage 74 includes a supporting flange 76 connected to the upper surface of the circular base 60 for adding rigidity to the liquid supply passage 74 and for guiding the housing 44 into the opening 56 of the container during assembly. The valve chamber 70 includes an end wall 78 having a valve seat 80 with an opening 82 in the center thereof. The valve seat opening 82 is in fluid communication with a discharge conduit 84 having a first end 86 adjacent the valve chamber 70 and a second end 88 remote therefrom.

Figure 2B:
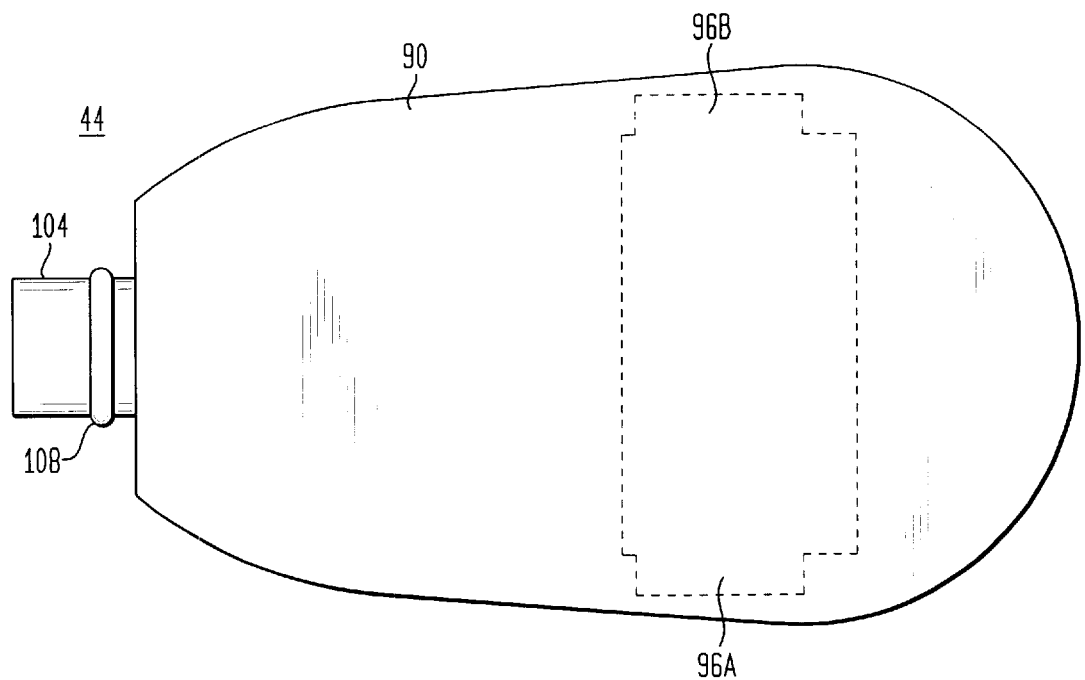
FIG. 2B shows a top view of the housing of FIG. 2A taken along line IIB—IIB of FIG. 2A.

Referring to FIGS. 2A and 2B, the housing 44 also has a substantially flat top surface 90 extending along the longitudinal axis thereof. The substantially flat surface preferably includes an indicia-bearing section so that a label, or other indicia, indicating the type of liquid/product stored in a container, may be placed on the flat surface. The front end of the housing also includes a flexible opening for securing a portion of an operating element, such as a trigger, as will be described in more detail below. The housing 44 has a lateral support 94 including lateral tabs 96A and 96B which are provided for connecting the housing the container, as will be described in more detail below.

Figure 2C:
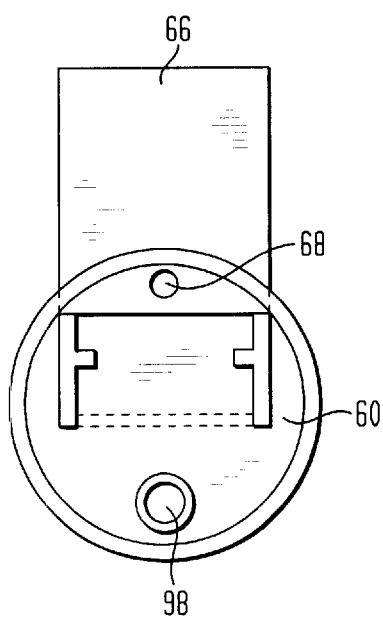
FIG. 2C shows a bottom view of the housing of FIG. 2A taken along line IIC—IIC of FIG. 2A.

FIG. 2C shows a bottom view of the housing 44. The underside of the circular member 60 includes aeration orifice 68 in communication with pump is chamber 66 and opening 98 in communication with liquid supply passage 74 (FIG. 2A) for providing fluid communication between the underside of circular member 60 and valve chamber 70.

Figure 3A:
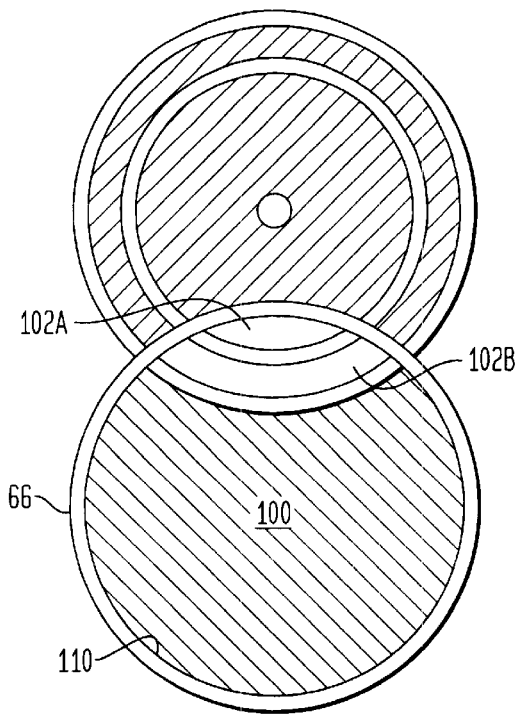
FIG. 3A shows a simplified front view of the pump chamber and the valve chamber of FIG. 2A.
Figure 3B:
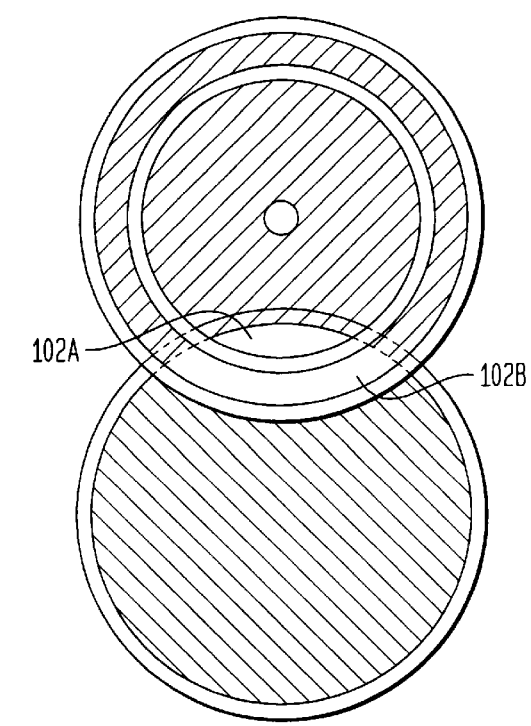
FIG. 3B shows a simplified rear view of the valve chamber and the pump chamber of FIG. 2A.

FIGS. 3A and 3B show simplified views of the pump chamber 66 and the valve chamber 70. FIG. 3A is a simplified front view of the housing 44 and shows the pump chamber 66 including rear wall 100 having two small openings 102A and 102B at the upper end of rear wall 100 for providing fluid communication between the pump chamber 66 and the valve chamber 70. FIG. 3B shows a rear view of the housing 44 including valve chamber 70 having rear wall 78 including openings 102A and 102B for providing fluid communication with the pump chamber 66. The pump chamber 66 includes a longitudinal axis extending in a direction substantially parallel to the discharge conduit 84. The valve chamber 70 also includes a longitudinal axis extending in a direction substantially parallel to the discharge conduit 84. However, the pump chamber 66 and the valve chamber 70 are not in alignment with one another as is the case with conventional fluid dispensers having a pump chamber in communication with a valve chamber. As a result, the housing may be manufactured using simplified injection molding techniques.

Referring to FIGS. 2A and 2B, the housing 44 also includes a discharge outlet 104 connected to the second end 88 of the discharge conduit 84 and having an opening 106 in fluid communication therewith. The discharge outlet 104 includes an annular ring or flange 108 extending around the outer surface thereof. Referring to FIGS. 1 and 2A, a discharge nozzle 50 may be secured to the outer surface of the discharge outlet 104. The discharge nozzle 50 includes a resilient material, such as plastic, and preferably includes an annular depression (not shown) sized to snap fit over the annular ring 108 on the exterior surface of the discharge outlet 104. After being assembled thereto, the discharge nozzle 50 may be rotated into various positions for modifying the type of liquid spray discharged from the liquid dispenser.

Referring to FIGS. 1 and 3A, the housing 44 includes the pump is chamber 66 having rear end wall 100 and an internal wall 110 with a substantially cylindrical shape when viewed in cross section. The substantially cylindrically shaped internal wall is sized for receiving the piston 46 including a piston rod and first and second annular piston flanges 115A and 115B. The piston 46 is adapted for reciprocating movement between a first end 114 and the rear wall 100 of the pump chamber 66. As mentioned above, the rear wall 100 of the pump chamber 66 closes off the pump chamber 66 from the valve chamber 70 except for the two small openings 102A and 102B providing fluid communication between the pump chamber and the valve chamber 70.

The piston 46 also includes a central bore 117 formed at the first end thereof and two lateral projections 116 having apertures 118 for facilitating a connection with the trigger 48, as will be described in more detail below.

Figure 4A:
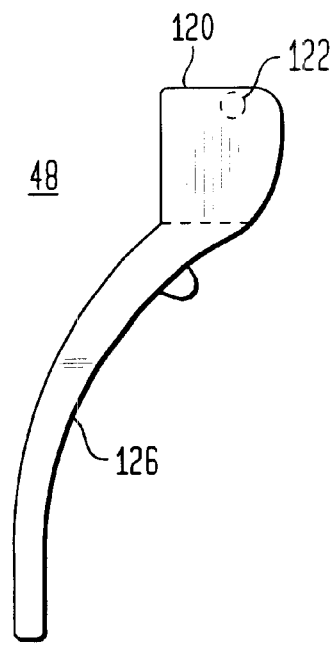
FIG. 4A shows a side view of the trigger shown in FIG. 1.
Figure 4B:
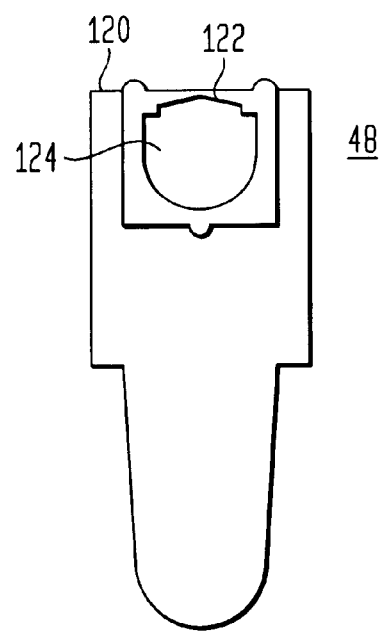
FIG. 4B shows a front view of the trigger shown in FIG. 4A.
Figure 4C:
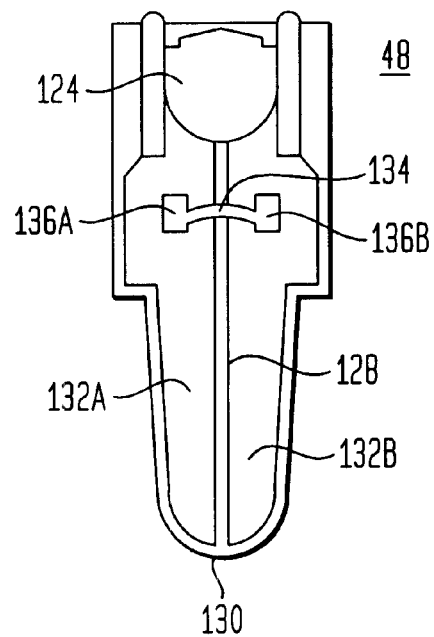
FIG. 4C shows a rear view of the trigger shown in FIGS. 4A and 4B.

Referring to FIGS. 1 and 4A–4C, the dispenser subassembly 42 includes an operating element, such as trigger 48. The trigger 48 includes an upper end 120 having a pivotable shaft 122 that may be received within the flexible opening 92 at the front end of the housing. The trigger 48 also includes an aperture 124 extending therethrough so that the discharge outlet 104 may fit through the aperture 124 when the trigger 48 is connected to the housing 44. Referring to FIG. 4C, the rear side 126 of the trigger 48 includes a support rib 128 extending between the lower end 130 of the trigger 48 and the annular opening 124. The support rib 128 defines two channels 132A and 132B extending between the lower end 130 and the trigger aperture 124. The trigger 48 also includes a lateral support 134 including protruding cams 136A and 136B that are sized to fit within the openings 118 at the first end of the piston 46.

Referring to FIGS. 1, 2A and 2C, the liquid dispenser 40 includes a dip tube 138 having a first end 140 secured to the liquid supply passage 74 extending to the valve chamber 70. The first end 140 of the dip tube 138 is preferably inserted into the opening 98 at the underside of the circular base 60 of the housing (FIG. 2C). The dip tube 138 has a second end 142 that preferably extends into the container 54 is after the dispenser subassembly 42 has been assembled with the container. The dip tube 138 draws the liquid stored in the container 54 into the liquid supply passage 74 and ultimately into the pump chamber 66.

Figure 5A:
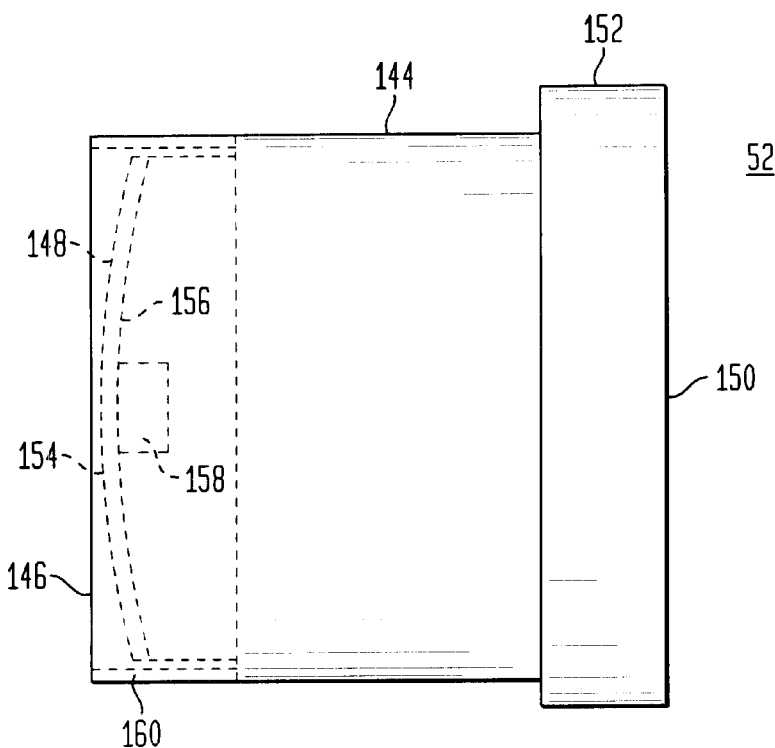
FIG. 5A shows a side view of the valve shown in FIG. 1.
Figure 5B:
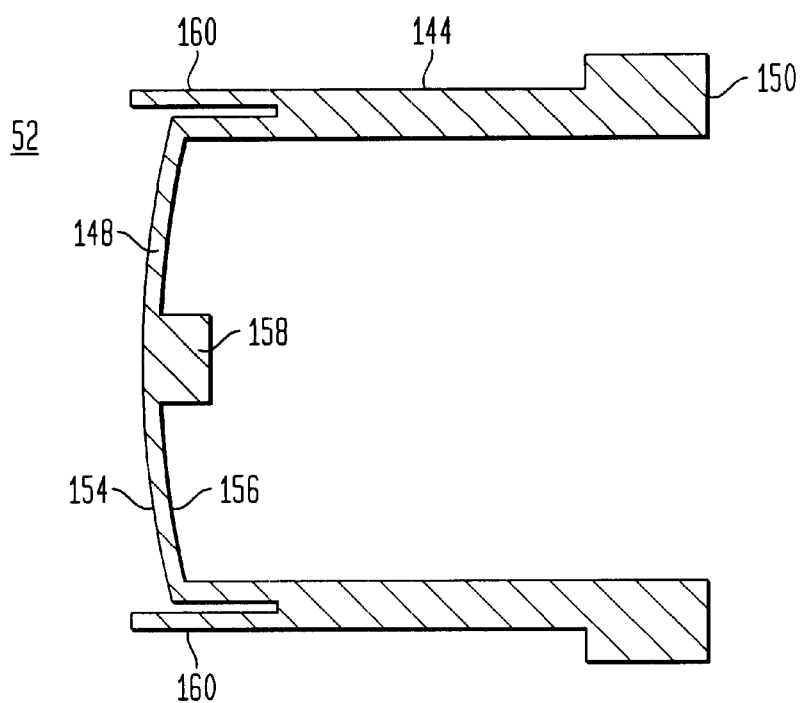
FIG. 5B shows a cross-sectional view of the valve shown in FIG. 5A.

Referring to FIGS. 1, 5A and 5B, the valve chamber 70 has a valve 52 secured therein. The valve 52 includes an exterior sleeve 144 having a cylindrical shape, the exterior sleeve 144 being sized to fit snugly within the cylindrical-shaped internal wall of the valve chamber 70. The valve has a first end 146 including a flexible diaphragm 148 and a second end 150 remote therefrom. Adjacent the second end 150 thereof, the valve 144 has an outer surface 152 having a diameter that is larger than the diameter of exterior sleeve 144. The diameter of outer surface 152 is also greater than the internal diameter of valve chamber 70 for halting movement of the valve 52 toward the rear wall 78 of the valve chamber 70 once the valve is properly seated in the valve chamber. The diaphragm 148 at the first end 146 of the valve has a substantially convex-shaped exterior surface 154 and a substantially concave-shaped interior surface 156. The interior surface 156 of the diaphragm 148 also has a stop member 158 integrally molded therewith for limiting the flexibility of the diaphragm 148 toward the second end 150 of the valve. The valve 52 also includes a peripheral flap 160 that projects from the first end 146 of the valve. The peripheral flap 160 extends completely around the outer periphery of the valve 52 and is flexible, as will be described in more detail below.

Referring to FIGS. 1 and 6A–6C, after the dispenser subassembly 42 has been assembled, it is adapted for being secured at least partially within the container 54. As used herein, the term container may mean a container that is a preform (having a shape similar to that of a test tube) or that has been blow molded into a desired shape. The container 54 includes an upper end 162 and a lower end 164 remote therefrom. The container has an opening 56 at the upper end 162 thereof. The opening 56 may be reinforced by circular ring 164 integrally molded and/or attached to the upper end 162 of the container 54. The container includes a shroud 166 extending from the upper end 162 of the container 54 and at least partially surrounding the opening 56. The shroud 166 includes a front end 168 having a depression 170 for allowing the discharge outlet 104 to extend therethrough. The shroud 166 also includes slots 172 formed on the sides thereof that are sized for receiving the lateral projections 96A and B extending from the housing 44 so that the housing may be secured (e.g., snap-fit) to the shroud 166. The shroud also includes a rear wall 174 having a substantially flat surface 176. The rear wall 174 is in substantial alignment with a peripheral edge of the opening 56 so that the rear wall 176 will closely engage the second end 150 of the valve 52 when the dispenser subassembly 42 is secured to the container 54. Thus the rear wall 174 of the shroud 166 locks and/or reliably secures the valve 52 within the valve chamber 70 and provides for an ambient pressure chamber between the concave face 156 of the valve and the rear wall 174.

Referring to FIGS. 6A–6C, the container 54 also includes at least one operating element connected thereto for operating the dispenser subassembly. In this preferred embodiment the container 54 includes a biasing element connected to the container adjacent the opening 56. The biasing element preferably includes two flexible arms 178A and 178B having lower ends 180 integrally connected to the container 54 and upper ends 182 extending away from the container. The flexible arm 178 include inverted U-shaped sections at the upper ends 182 thereof that extend toward the front end 168 of the shroud 166. The front end of the shroud also includes an aperture 170 for allowing the trigger assembly to pass therethrough when the subassembly 42 is secured to the container 56. After assembly, the inverted U-shaped portion 182 of the biasing element 178 engages the channels 132A and 132B (FIG. 4C) on the rear side of the trigger 48 for urging the trigger into an extended or charged position, as will be described in more detail below. The operating/element may also include the outer surface 183 of the shroud that can serve as a grip for securing the liquid dispenser.

Referring to FIGS. 1–6C, in one preferred assembly method, the dispenser subassembly 42 is first assembled and the dispenser subassembly is then secured to container 54. The dispenser subassembly is assembled by first inserting the upper end 140 of the dip tube 138 into the opening 98 in the underside of the circular member 60. The valve 52 is then connected to the housing 44 by inserting the first end of the valve 52 into the valve chamber 70 until the larger outer surface 152 at the second end 150 of the valve 52 engages the outer edge of the valve chamber 70. The piston 46 is then inserted into the pump chamber 66 so that the central bore 115 and the lateral openings 118 of the piston 46 extend from the outer end 114 of the pump chamber. The trigger 48 is then connected to the housing 44 by snapping the shaft 122 at the upper end 120 of the trigger 48 into the opening 92 at the front end of the housing 44 so that the trigger 48 is hingedly connected with the housing. The trigger is then operatively connected to the piston 48 by snapping the protruding cams 136A and 136B at the rear 126 of the trigger 48 into the lateral openings 118 of the piston 46. After the trigger has been completely connected, the discharge outlet projects through the aperture 124 extending through the trigger 48. The nozzle 50 is then attached to the discharge outlet 104 at the second end 88 of the discharge conduit 84.

Figure 7:
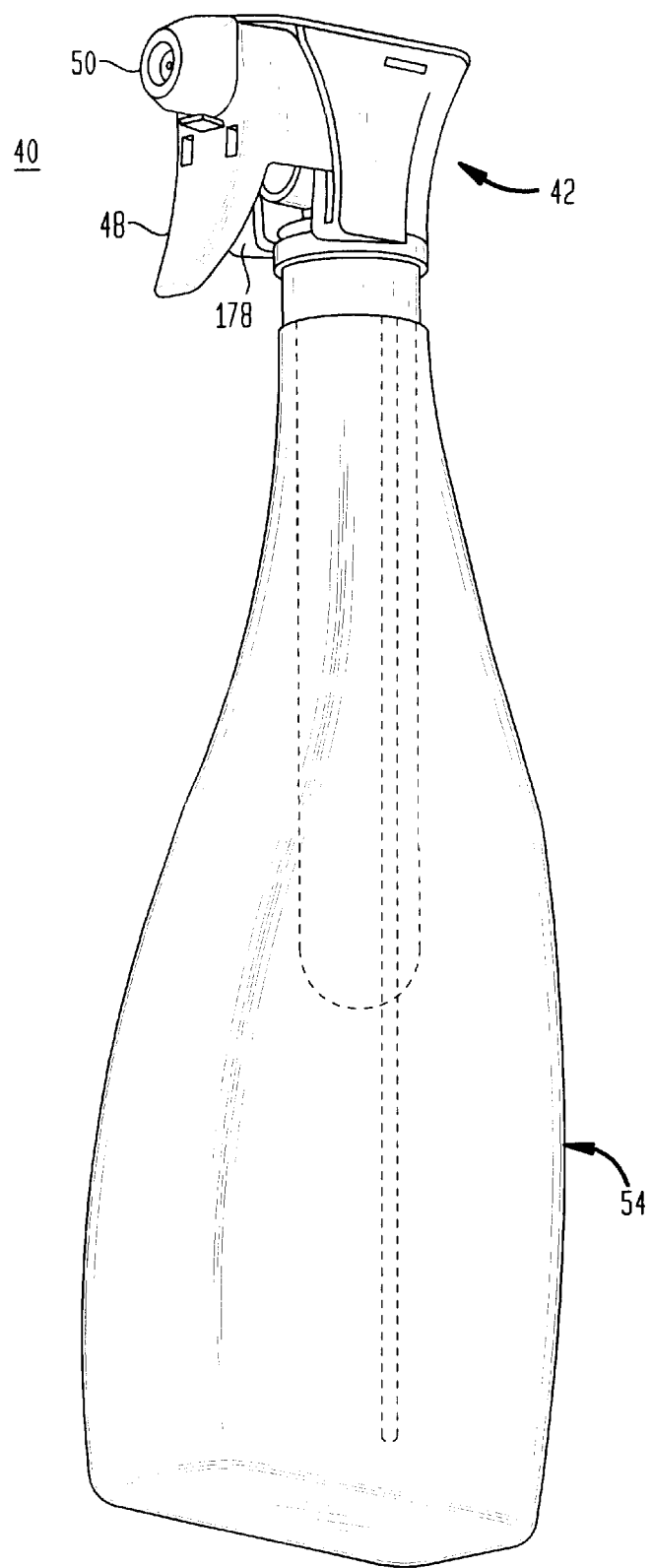
FIG. 7 shows the liquid dispenser of FIG. 1 after the dispenser subassembly has been assembled with the container 7.

The completely assembled dispenser subassembly 42 may then connected to the container 54 by inserting the subassembly into the shroud until the circular member 60 fits snuggly with in the container opening 56. The insertion of the dispenser subassembly 42 into the container 54 is limited by the annular flange 62 of the circular base 60 contacting the n hery of the container opening 56. The upper end of the subassembly 42 is secure the shroud 166 by inserting the tabs 96 at the sides of the housing into the slots of the shroud. After the tabs have been fully inserted into the slots, the substantially flat top surface 90 of the housing 44 lies directly above the upper edge of the shroud and lies in a plane parallel to the upper edge of the shroud. The completely assembled liquid dispenser is shown in FIG. 7.

Figure 8A:
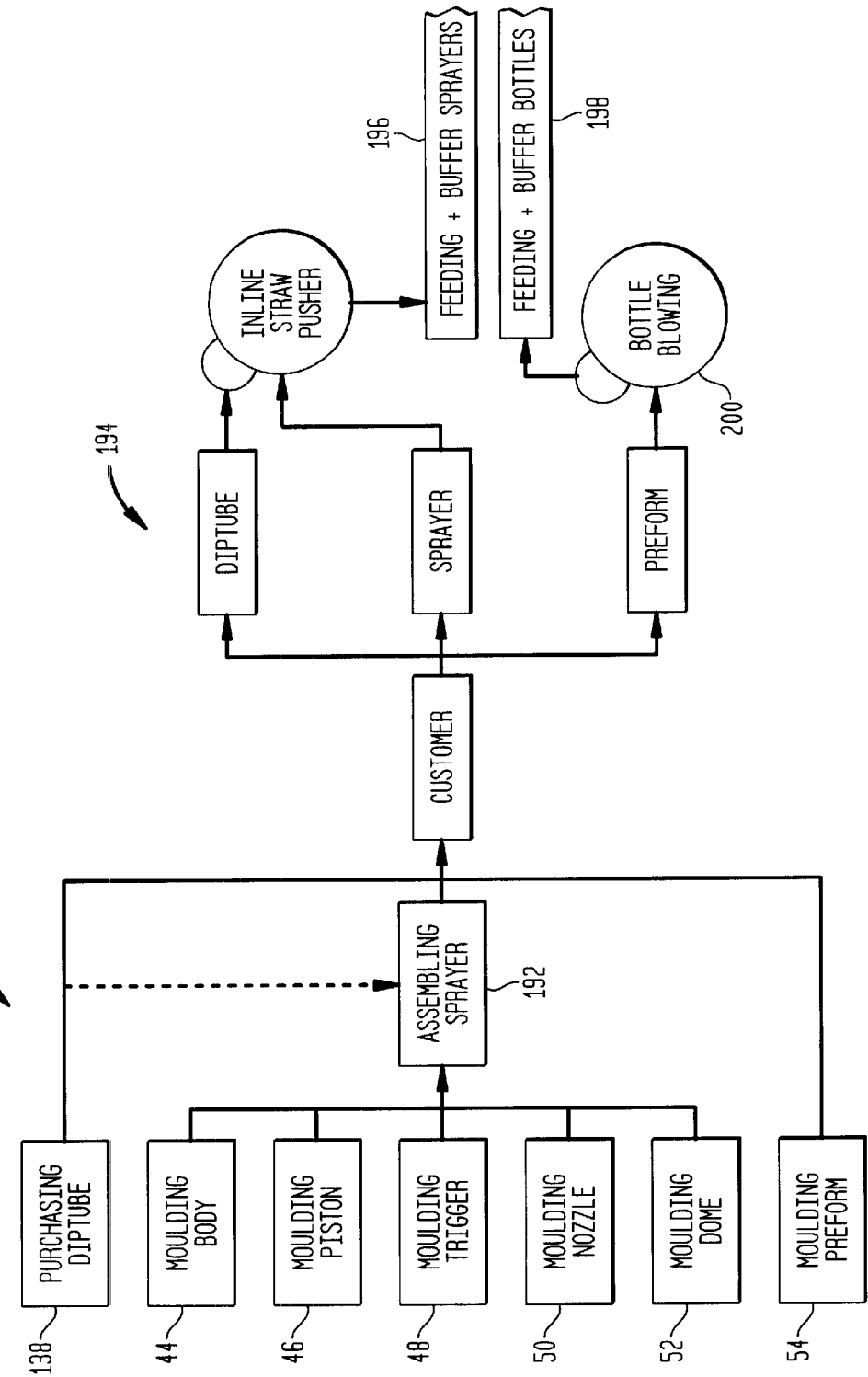
FIG. 8 is a schematic drawing showing one method of assembling the liquid dispenser shown in FIG. 1, in accordance with certain preferred embodiments of the present invention.
Figure 8B:
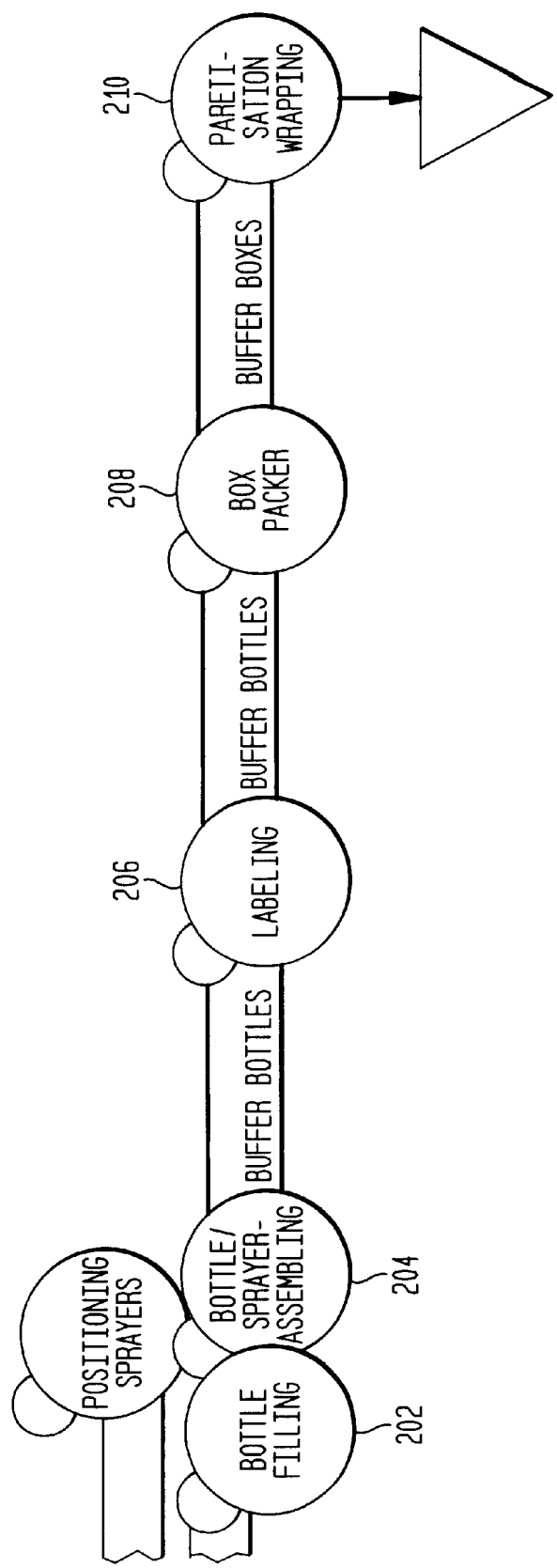

FIG. 8 is a schematic diagram showing one preferred method for forming, assembling and filling the liquid dispenser of the present invention. At a first location 90, the housing 44 including the circular base 60, the pump chamber 66, the valve chamber 70, the liquid supply passage 74, the discharge conduit 84 and the discharge outlet 104 is injection molded in one step. In addition, the trigger 48, the piston 46, the valve 52, the nozzle 50 and the dip tube 138 are formed by any suitable technique, such as injection molding. All of these component parts are assembled together at step 192.

At either the same location or a different location, the container 54 is formed. The container 54 preferably has an operating element of the liquid dispenser connected to or integrated therewith. In the embodiments described above, the operating element integrated with the container 54 is the biasing element 178 and the shroud 166. In other preferred embodiments, the integrated operating element may be either the biasing element 178 alone, without the shroud, or the shroud 166 alone, without the biasing element. The container 54 is preferably first molded as a relatively thick-walled preform having a shape that is substantially similar to that of a test tube. The size of the test-tube shaped preform is substantially smaller than the size of the final container after the preform has been blow molded into a desired shape. The preform container 54 is then shipped to a liquid filling and assembly point before it is blow molded into a larger container. As a result, the cost of transporting and storing the preform before final assembly is substantially reduced. The various parts of the liquid dispenser, including the preform and the dispenser subassembly are then transported at step 194 to a final assembly location, where the preforms are blow molded into a container having a desired shape, filled with a liquid product, and assembled with the dispenser subassemblies.

At the final assembly station, the dispenser subassembly is moved to a positioning station via a buffer 196. The test-tube like preform 54 with its integrated biasing element and shroud is supplied to a filling line via buffer 198. At a first station 200, the test-tube like preform 54 is heated and blow molded into a container having the desired final shape. The preform is preferably provided with a handling edge so that the preform may be secured by a mechanical processing element. After the container is blow molded at the blow molding station 200, the formed container is filled with a liquid, such as a liquid detergent, at filling station 202. Finally, the filled container is closed at assembling station 204 by securing the dispenser subassembly to the container. The liquid dispenser is then labeled at station 206, packed in boxes at station 208, and palletized and wrapped at station 210.

Because the container includes an element for operating the liquid dispenser (i.e., discharging a liquid stored therein), final assembly and charging of the liquid dispenser takes place at the moment that the container 54 is filled with a liquid and the dispenser subassembly has been secured to the container at station 204. As a result, the total number of steps that must be performed to assemble the liquid dispenser of the present invention is much lower than the number of steps required for conventional trigger sprayers having dispensing housings that must be completely preassembled before being connected to a liquid container.

In the preferred embodiment shown in FIGS. 1–8, the assembled liquid dispenser 40 includes a precompression system that prevents liquid from being discharged through the discharge nozzle until a predetermined pressure level has been attained within the pump chamber. Discharging liquid from the discharge nozzle 50 at an insufficient pressure level is highly undesirable and will result in the liquid being insufficiently atomized, whereby drops generated in the spray pattern will be too large. In order to prevent this from occurring, the present invention provides a precompression system between the liquid container 54 and the discharge nozzle 50 that includes a normally closed valve 52 that normally closes the opening 82 in the valve seat at the upstream end 86 of the discharge conduit 84. The diaphragm is normally closed over the valve seat due to its domed configuration and assisted by the ambient pressure chamber between the concave face of the diaphragm and the substantially flat end wall of the shroud. The diaphragm moves away from the opening in the valve seat 80 only when sufficient pressure, for instance on the order of three bar, is built up in the pump chamber 66 when the piston 46 moves toward the rear wall 100 of the pump chamber 66. Moreover, unlike conventional precompression systems, the precompression system of the present invention does not require the pump chamber and the valve chamber to be in alignment with one another. This is because the valve 52 and the ambient pressure chamber behind the concave face of the valve 52 provides the spring force that must be overcome in order to open the valve. This provides a dramatic improvement over prior art precompression systems requiring the use of metal springs and alignment between the pump chamber and the valve chamber. Since the pump and the valve chambers of the present invention do not have to be in alignment, the dispenser subassembly may be produced using a one step injection molding step, rather than the multiple step process required when making prior art precompression systems.

Figure 9:
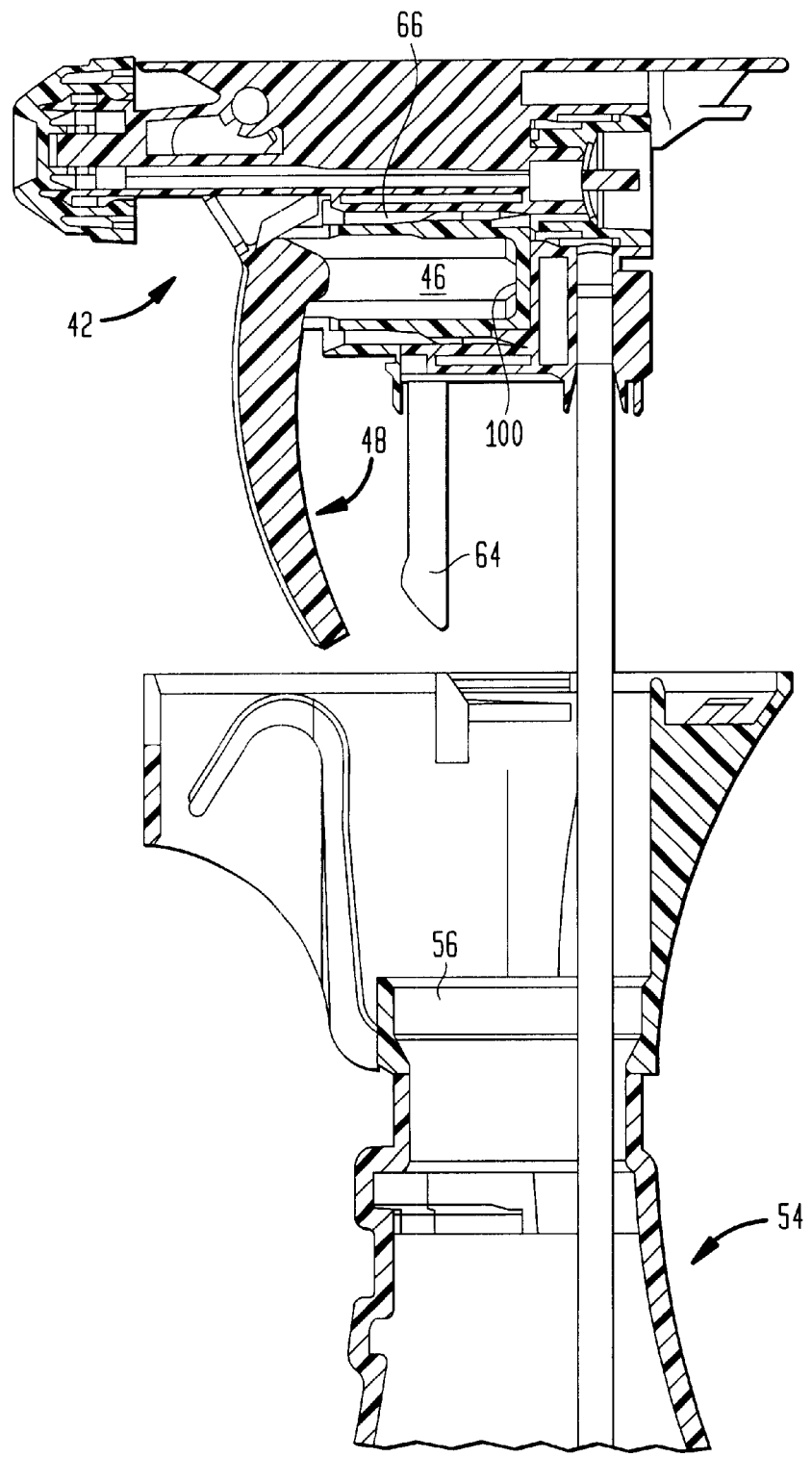
FIG. 9 shows a first step for assembling a dispenser subassembly with a container, in accordance with certain preferred embodiments of the present invention.
Figure 10:
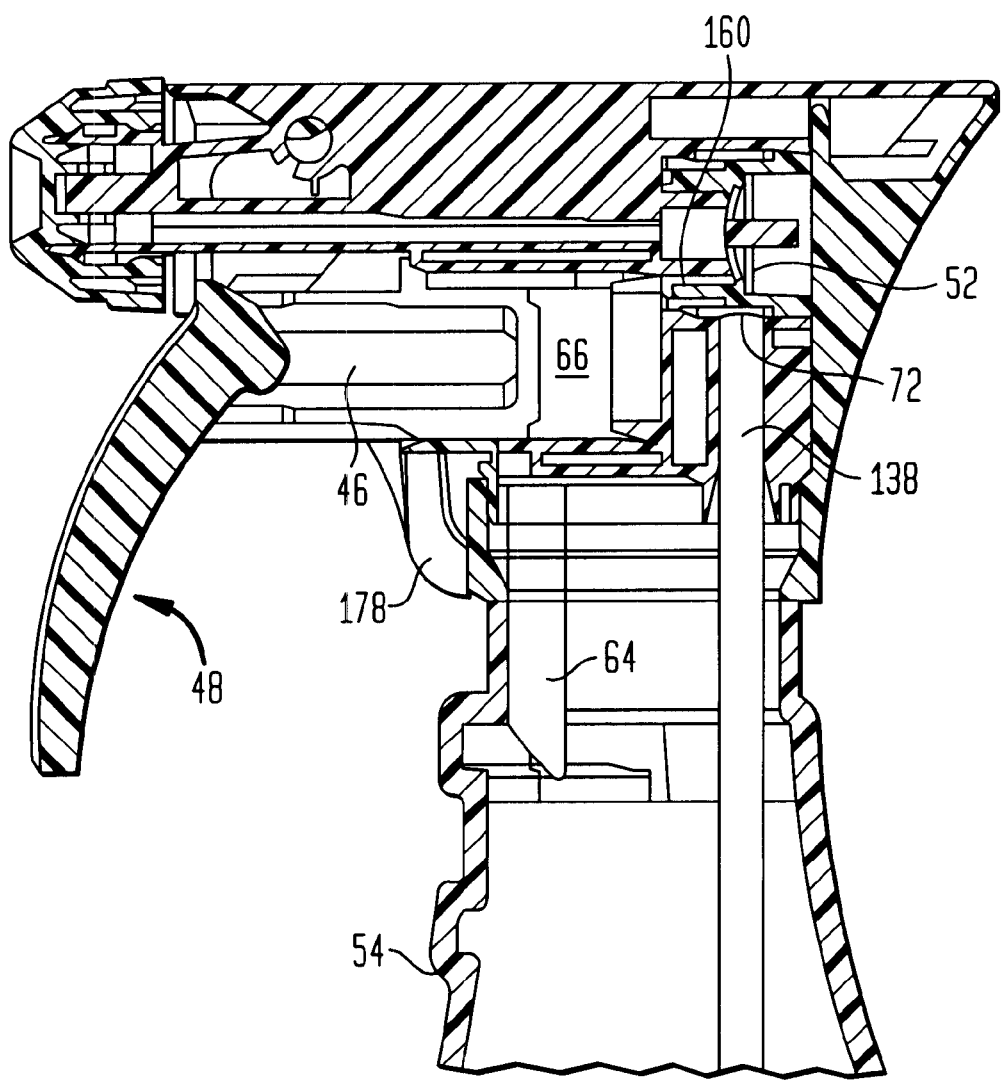
FIG. 10 shows a further step for assembling a dispenser subassembly with a dispenser.
Figure 11:
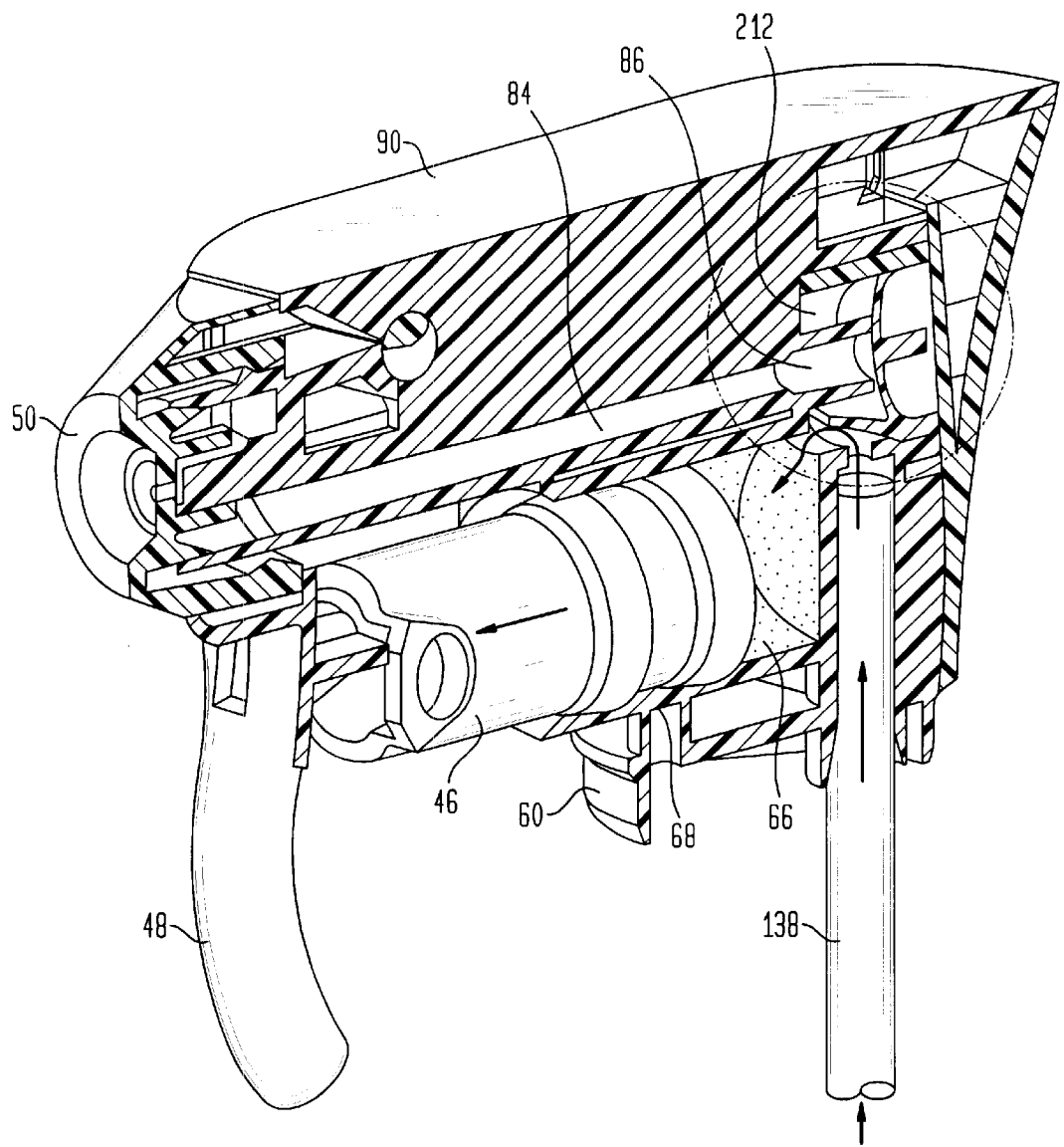
FIG. 11 shows a fragmentary cross-sectional view of the liquid dispenser of FIG. 10 during a suction stroke, in accordance with certain preferred embodiments of the present invention.
Figure 12:
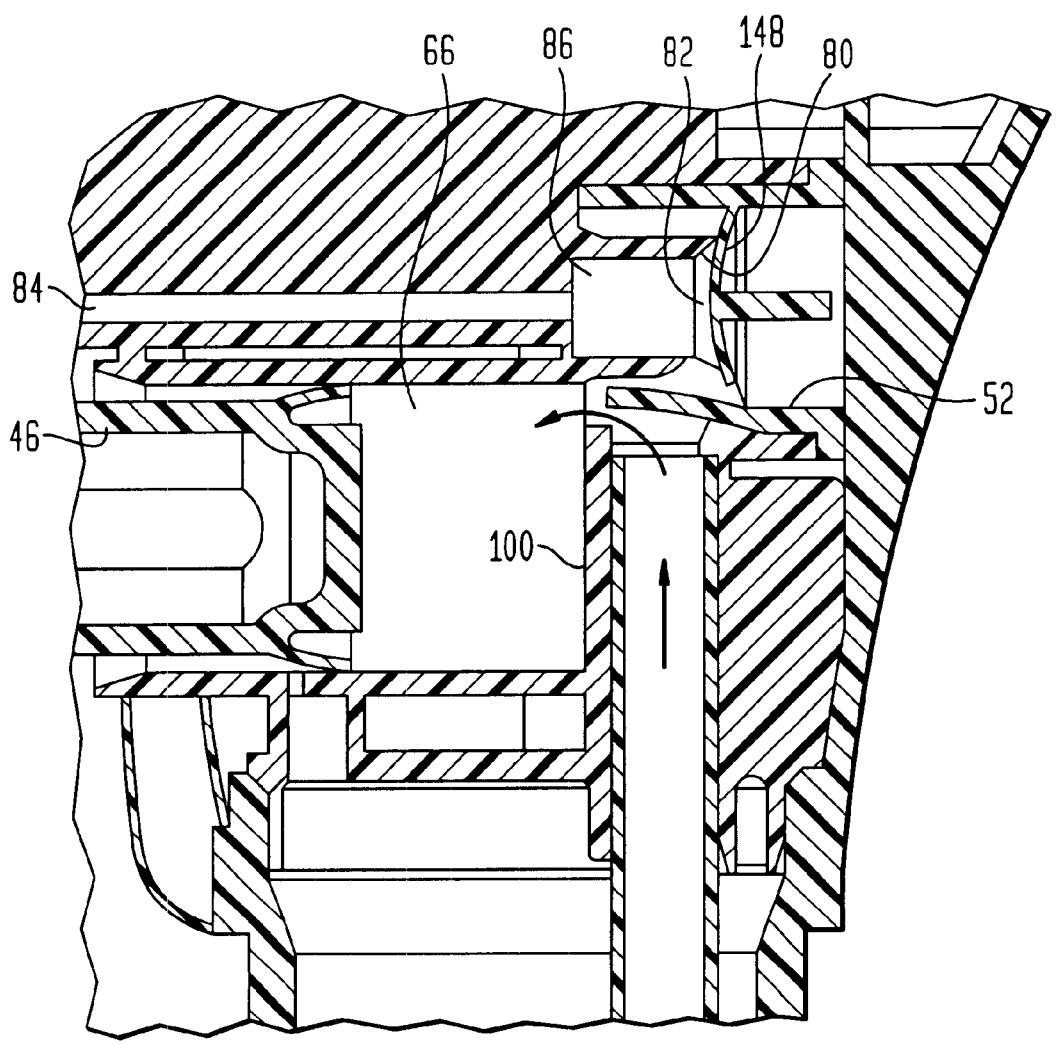
FIG. 12 shows an expanded view of the highlighted area of FIG. 11 with a dip tube shown in cross-section.

Referring to FIGS. 9 and 10, the liquid dispenser 40 is primed or charged when the dispenser subassembly 42 is assembled with the container 54. Just before final assembly, the container 54 is filled with liquid, and the trigger 48 of the dispenser subassembly 42 is moved to the rearward position shown in FIG. 9. Moving the trigger 48 to the rear causes the piston 46, which is connected to the trigger 48, to move toward the rear wall 100 of the pump chamber 66. Priming occurs when the trigger 48 is forced into the forward position shown in FIG. 10. As the dispenser subassembly is inserted into the container opening, biasing element 178 engages the rear side of the trigger, thereby forcing the trigger to move to the forward position shown in FIG. 10. Referring to FIGS. 9–12, as the trigger 48 moves forward, the trigger pulls the piston 46 away from the rear wall 100 of the pump chamber 66, creating a vacuum in the pump chamber 66. The vacuum in the pump chamber 66 pulls the peripheral flap 160 of valve 52 away from opening 72 so as to draw liquid through dip tube 138, past the peripheral flap 160 and into the pump chamber 66. The pump chamber will generally be filled with liquid once the piston 46 has reached the end of the return stroke.

Figure 13:
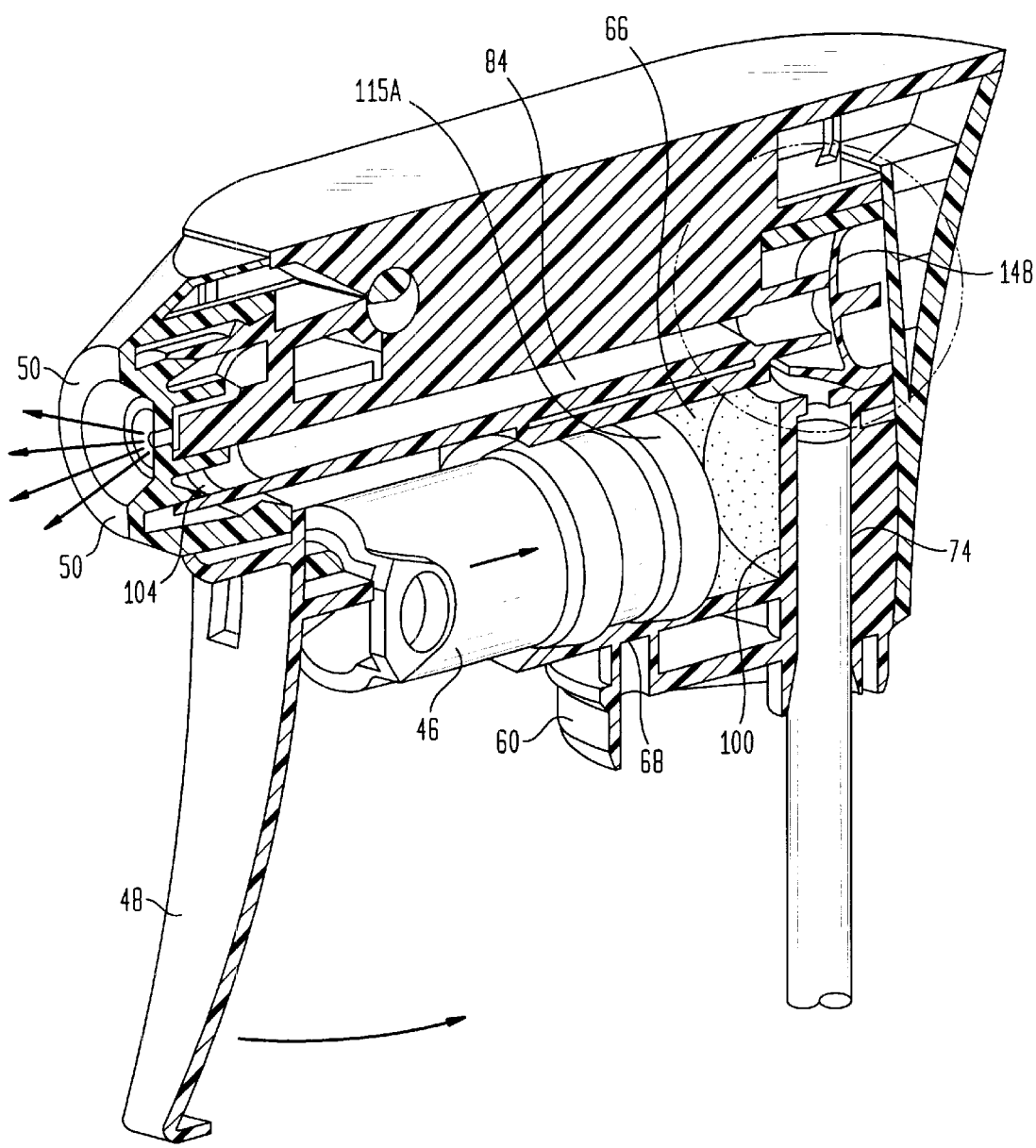
FIG. 13 shows a fragmentary cross-sectional view of the liquid dispenser of FIG. 10 during a discharge stroke, in accordance with certain preferred embodiments of the present invention.
Figure 14:
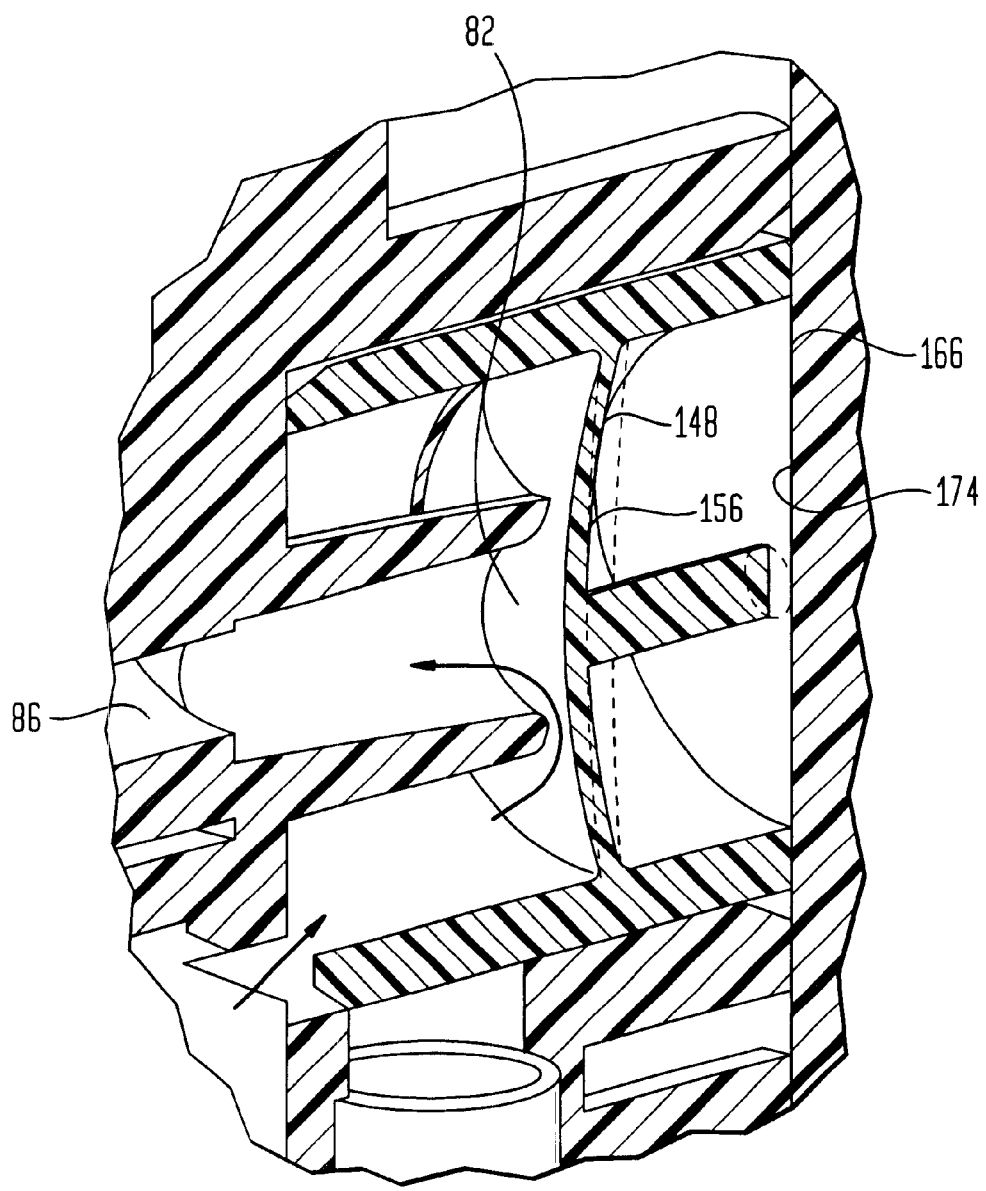
FIG. 14 shows an expanded view of the valve shown in FIG. 13.

Referring to FIGS. 13 and 14, when a user desires to discharge liquid from the liquid dispenser 40, the user pulls the trigger 48. Pulling the trigger 48 forces the piston 46 toward the rear wall 100 of the pump chamber 66, thereby reducing the volume of the pump chamber 66 and compressing the liquid and the air present in the pump chamber. The valve 52 will not open until the pressure within the pump chamber is greater than the combination of the spring force of the diaphragm and the ambient pressure on the concave face of the diaphragm. When the pressure of the air in the pump chamber is greater than the combination of the spring force exerted by the diaphragm 148 and the pressure of the ambient air between the concave face 156 of the diaphragm and the rear wall 174 of the shroud 166, the diaphragm 148 is forced away from the opening 82 in the valve seat 80 so that the air and the liquid within the pump chamber may pass through the opening 82 at the second end 86 of the discharge conduit 84. The liquid will then pass through discharge conduit 84 onto outlet 104, where the liquid will be atomized through nozzle 50.

The liquid dispenser includes an aeration hole that prevents a partial vacuum from forming within the container during operation thereof. Referring to FIG. 13, the aeration hole 68 is provided between the pump chamber 66 and the underside of the circular member 60. During a discharge stroke, when the first flange 115A of the piston passes over the aeration hole 68 as the piston 46 moves toward the rear wall of the pump chamber 66. When the first flange 115A passes the aeration hole, the atmosphere within the container is exposed to the external atmosphere (i.e., ambient air) outside the container. Conversely, during a suction stroke (FIG. 11), the container is sealed off from the external atmosphere once the first sealing flange 115A of the piston 46 passes beyond the aeration hole 68, so that the aeration hole is between the first flange 115A and the rear wall 100 of the pump chamber 66.

Figure 15:
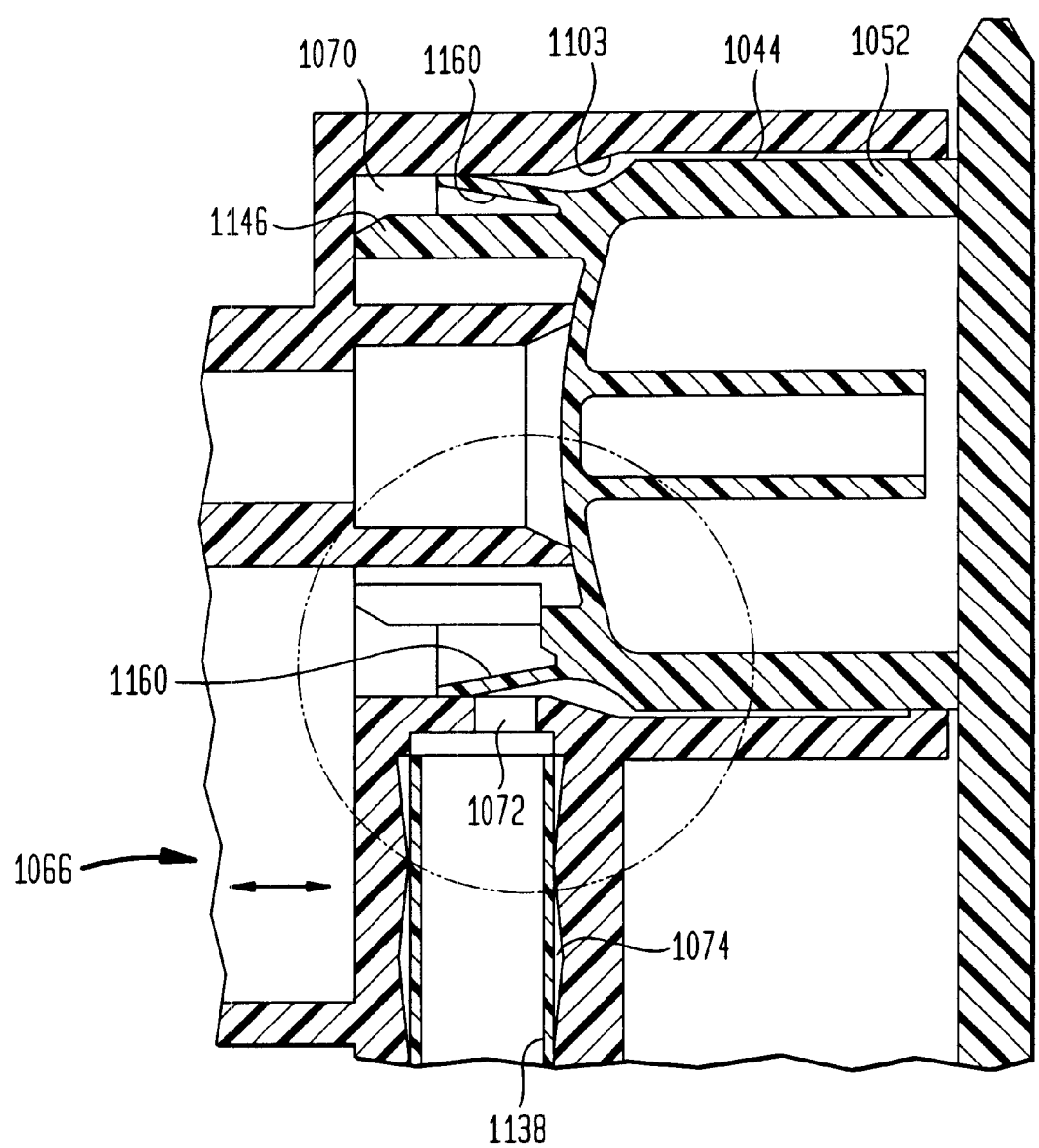
FIG. 15 shows a fragmentary cross-sectional view of precompression system for a liquid dispenser, in accordance with certain preferred embodiments of the present invention.

In another preferred embodiment of a precompression system for a liquid dispenser, as shown in FIG. 15, the exterior sleeve 1144 of the valve 1052 has no opening in fluid communication with the liquid supply passage 1074. Instead, the exterior sleeve has an outwardly extending peripheral flap 1160 projecting from the first end 1146 of the valve 1052. The peripheral flap 1160 is flexible, extends completely around the outer periphery of the valve 1052, and, because it is inclined toward the internal wall of the valve chamber, normally fits snugly against the internal wall of the valve chamber. During a suction stroke, the peripheral flap is pulled away from the opening 1072 in the liquid supply passage 1074 so that liquid is able to flow through the opening 1072 and into the pump chamber 1066 by the exterior sleeve 1144 portion of the valve 1052 but is not able to flow past the second end of the valve 1152 having a larger diameter than the exterior sleeve 1144 portion. However, the liquid is able to flow by the smaller diameter exterior sleeve 1144 and the peripheral flap 1160 and into the pump chamber 1066.

The precompression system shown in FIG. 15 provides excellent sealing characteristics. Due to the sealing action of the peripheral flap 1160 of valve 1052, the pump pressure does not act on the cylindrical sleeve 1144 of the valve 1052, and therefore the risk of fluid or liquid leaking past the cylindrical sleeve 1144 is greatly reduced. Also, the sleeve may be made smaller and lighter than in previously described embodiments because there is no need for a reinforcing flange along the periphery of the sleeve. Still further, the valve 1052 is easy to manufacture by injection molding, because it does not have any side opening and its associated valve means does not require any sliding cores or mandrels to be included in the mold. In addition, the valve 1052 may be easily installed because the external sleeve 1144 is completely symmetrical along its longitudinal axis. Finally, there is no need for any opening to be aligned with the liquid supply opening 1072 communicating with the dip tube 1138.

In other preferred embodiments, the angle of inclination of the peripheral flap may be somewhat smaller than that shown in FIG. 15, whereas the interior wall of the valve chamber may have a larger inclined portion.

Figure 16A:
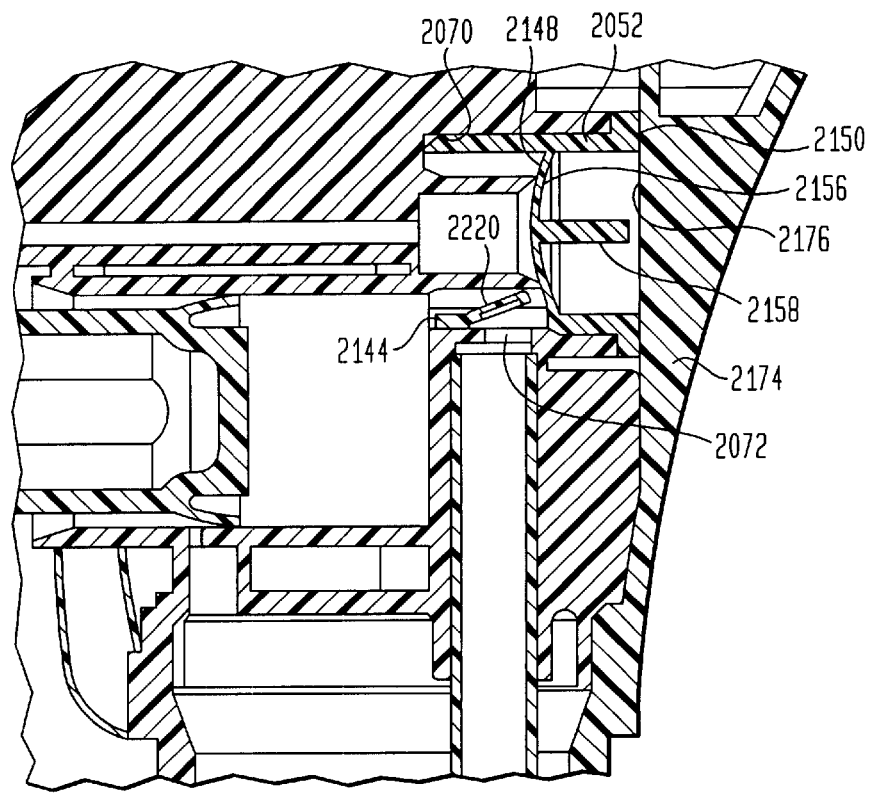
FIG. 16A shows a cross-sectional view of a precompression system for a liquid dispenser during a suction stroke, in accordance with further preferred embodiments of the present invention.
Figure 16B:
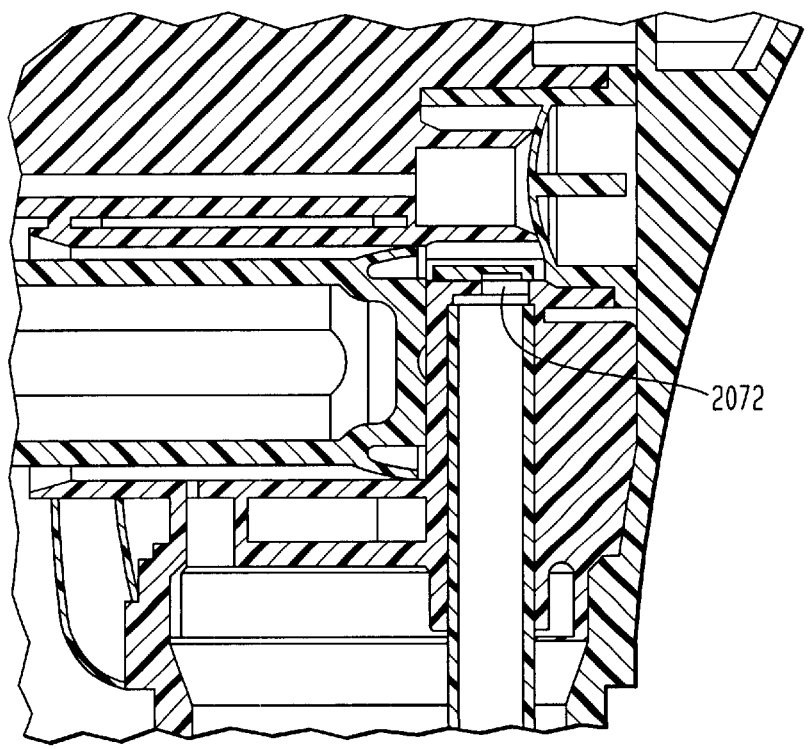
FIG. 16B shows the precompression system of FIG. 16A during a discharging stroke.

FIGS. 16A and 16B show a further preferred embodiment wherein the valve 2052 includes a flapper valve 2220 that is integrally connected with the sleeve 2144 of the valve by a hinge. The valve 52" is pivotable between a position in which it is displaced from the liquid supply passage opening 2072 (FIG. 15A) and a position in which it seals the liquid supply passage opening 2072 (FIG. 15B). The valve also includes a stop member 2158 connected to the concave face 2156 of the diaphragm 2140. The stop member 2156 serves to limit the bending or flexing of the diaphragm 2148 and to prevent it from "flipping over" or turning inside out. The valve 2052 is locked in the valve chamber 2070 by the flat surface 2176 of end wall 2174 engaging the second end 2150 of valve 2052. The end wall 2174 prevents the valve 2052 from backing out of the valve chamber 2070 during operation of the dispenser. The end wall 2174 also engages the stop member 2156 to prevent the diaphragm from turning inside out.

Figure 17:
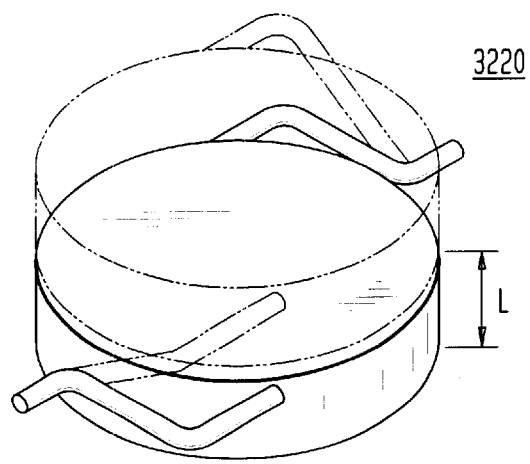
FIG. 17 shows a valve subassembly, in accordance with further preferred embodiments of the present invention.

In other preferred embodiments, the flapper valve of FIGS. 16A and 16B may be replaced by the spider valve 3220 shown in FIG. 17. Although certain preferred embodiments have been described in FIGS. 11–17, the precise shape of the valves and/or the peripheral flaps extending from the first ends of the valves is not critical so long as each valve allows liquid to enter the pump chamber via the liquid supply passage during a suction stoke and exerts sufficient pressure on the internal wall of the valve chamber to ensure a perfect seal during a discharge stroke.

Figure 18:
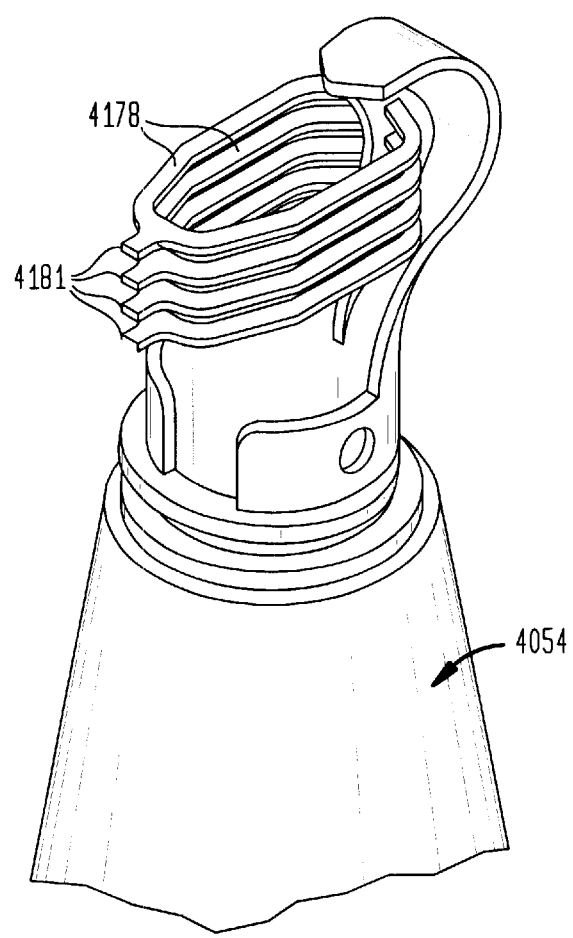
FIG. 18 shows a perspective view of a container for a liquid dispenser, in accordance with further preferred embodiments of the present invention.
Figure 19:
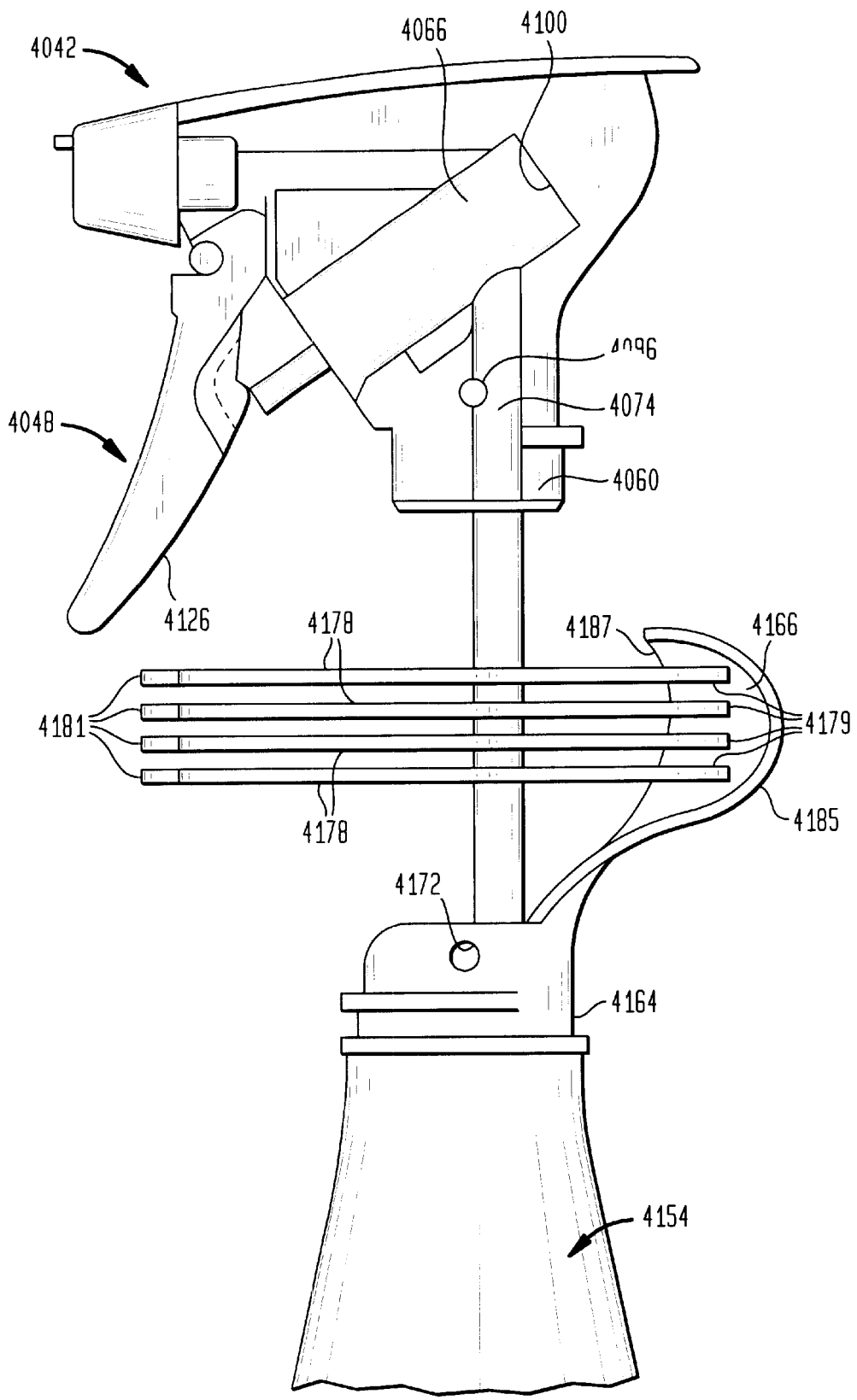
FIG. 19 shows the container of FIG. 18 being assembled with a dispenser subassembly, in accordance with still further preferred embodiments of the present invention.
Figure 20:
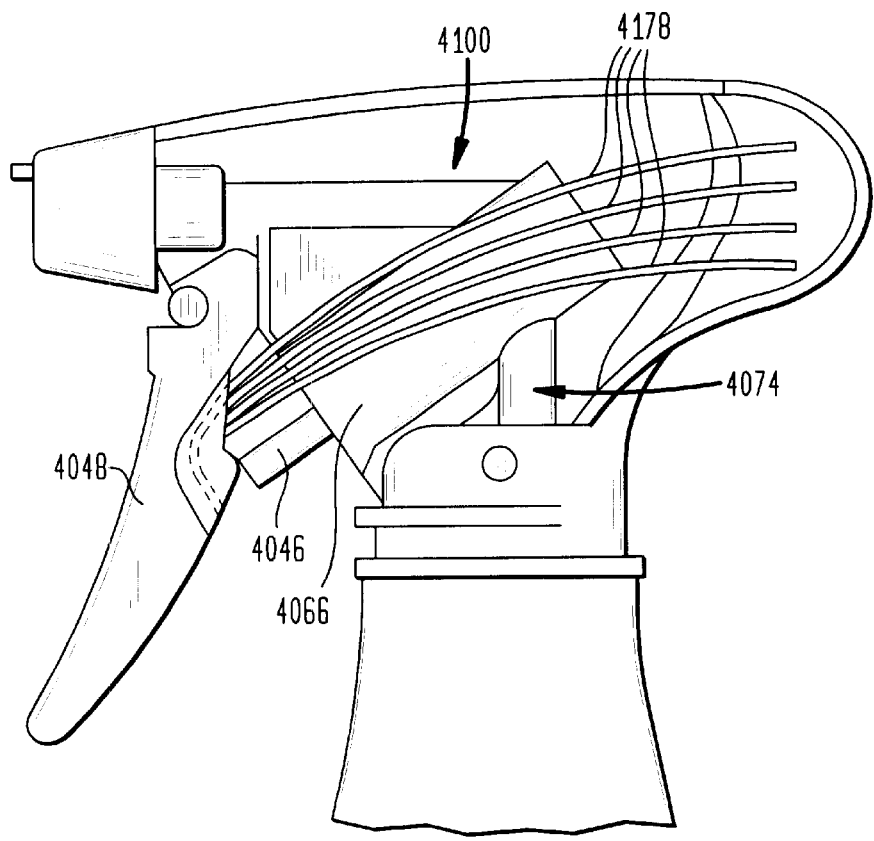
FIG. 20 shows the liquid dispenser of FIG. 19 after the dispenser subassembly has been connected to the container.

Referring to FIGS. 18–20, in a further preferred embodiment the actuating element includes a pair of parallel, flexion springs 4178 that arc adapted for engaging channels provided in the rear surface 4126 of the trigger 4048. The springs 4178 each have a closed contour configuration and are fixed on one end 4179 to a column 4166 that extends upwardly from the container neck 4164. The opposite end of each spring 4178 has a protrusion 4181 adapted for engaging the chamber in the rear of the trigger 4048. The column 4166 includes of a curved web 4185 and a reinforcing rib 4187 arranged therein, and has a substantially cylindrical base 4189 which is attached to the neck 4164 of the container 4054. The base 4189, the column 4166 and the springs 4178 are integrally molded with the container 4054. Two opposite opening 4172 are provided in the base 4189 and are arranged to cooperate with two protruding snap members 4096 on the dispenser subassembly 4042. Referring to FIG. 19, when assembling the subassembly 4042 to the container 4054, the flexion springs 4178 are introduced into the channels at the rear 4126 of the trigger 4048. To this end, the piston 4046 must be moved to its outermost position within the pump chamber 4066. The subassembly 4042 may be connected to the container 4054 by inserting tabs 4096 engaging into openings 4172.

Referring to FIG. 20, during a pumping stroke, when the trigger 4048 is pressing the piston 4046 into the pump cylinder 4066, the springs 4178 are compressed. When the pressure on the trigger 4048 is released, the trigger is forced is back to the charged position by the bias force of the springs. Because the trigger 4048 is connected to the piston 4046, as the trigger is forced back toward the charged position, the trigger will pull the piston away from the rear wall 4100 of the pump chamber 4066, thereby creating suction in the pump chamber 4066 and drawing liquid through the liquid supply passage 4074.

Figure 21:
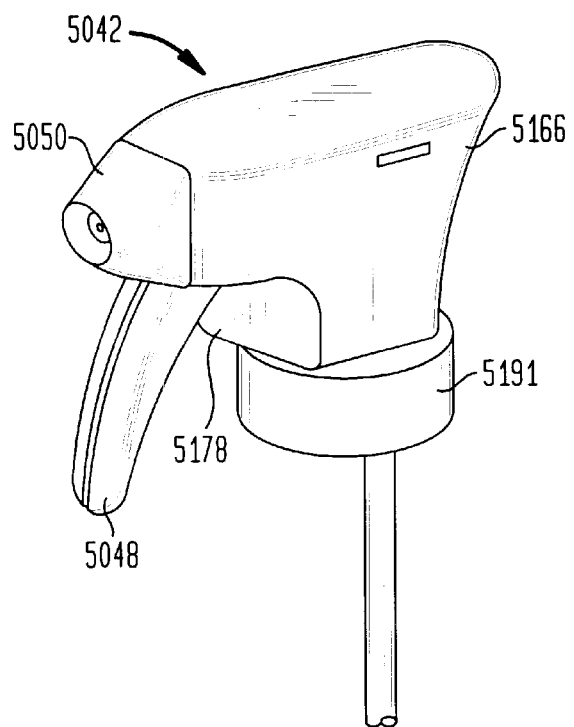
FIG. 21 shows a dispenser subassembly and an actuating element, in accordance with further preferred embodiments of the present invention.
Figure 22:
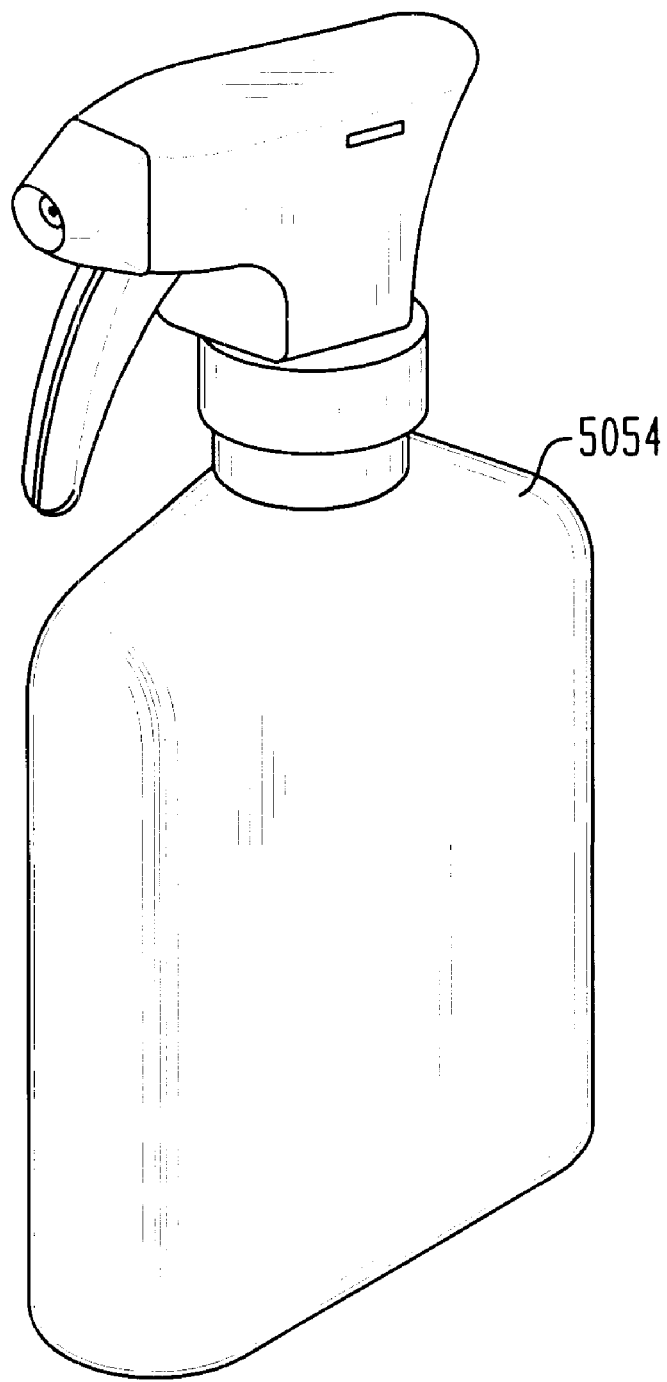
FIG. 22 shows the dispenser subassembly and the actuating element of FIG. 21 after the dispenser subassembly and the actuating element have been assembled with a container.

Referring to FIGS. 21 and 22, in further preferred embodiments of the present invention, the dispenser subassembly 5042 may be connected with conventional containers 5054 having necks with screw threads or bayonet connector type necks. In this particular embodiment, the dispenser subassembly 5042 having trigger 5048 and nozzle 5050 is secured within shroud 5166 integrally connected to ring 5191. An actuating element 5178, such as biasing springs, is not preassembled or integrated with the container 5054, as shown above, but rather with the separate ring 5191. The ring or cap may be fixed to the container 5054 before the dispenser subassembly is secured to the container and the ring. Although some of the advantages set forth above may be lost, the advantages related to a liquid dispenser having a limited number of parts remain.

FIGS. 23–29 show a liquid dispenser 6040 in accordance with further preferred embodiments of the present invention. Referring to FIGS. 24A and 24B, the liquid dispenser includes a dispenser subassembly 6042 including a housing 6044 having a liquid supply passage 6074, a valve chamber 6070, a pump chamber 6066 and a discharge conduit 6084 including a discharge outlet 6104. The housing 6044 includes two cylindrical shaped chambers arranged next to each other, the pump chamber 6066 and the vent chamber 6068.

Figure 23:
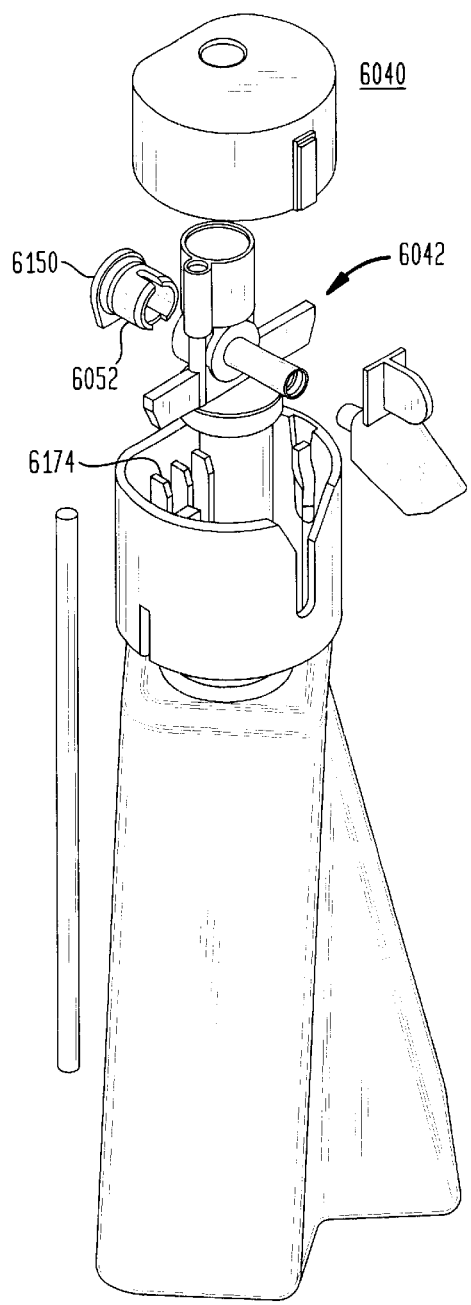
FIG. 23 shows an exploded view of a liquid dispenser including a housing, a movable element, a valve, a dip tube, a locking element and a container, in accordance with further preferred embodiments of the present invention.
Figure 24A:
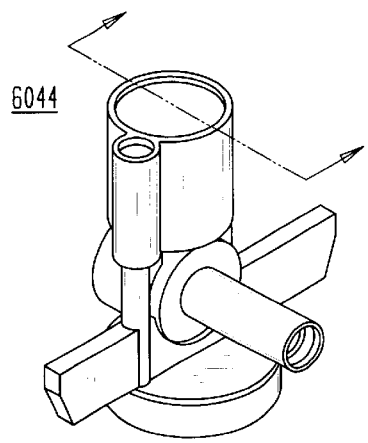
FIG. 24A shows a perspective view of the housing shown in FIG. 23.
Figure 24B:
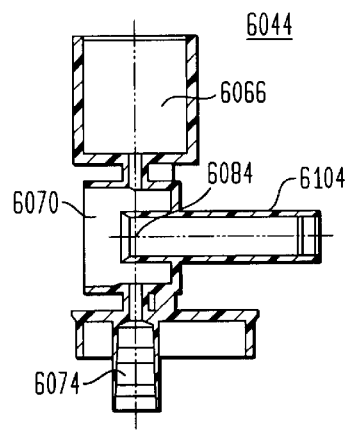
FIG. 24B shows a cross-sectional view of the dispenser housing of FIG. 24A.
Figure 25A:
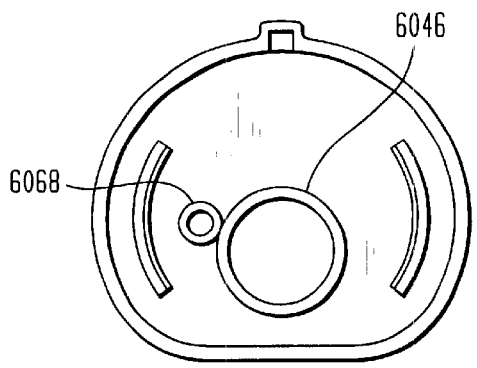
FIG. 25A shows a bottom view of the movable element shown in FIG. 23.
Figure 25B:
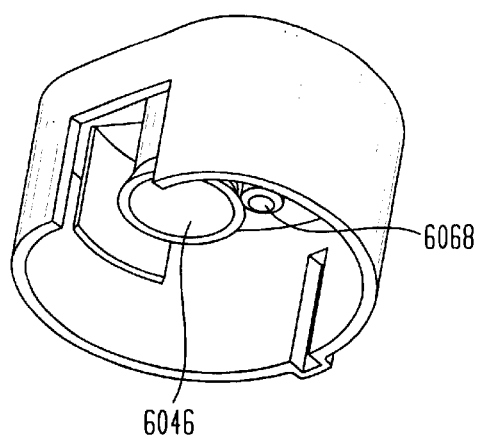
FIG. 25B shows a perspective view of the movable element shown in FIG. 23.

Referring to FIGS. 23 and 25A–25B, the liquid dispenser 6040 includes a moving member 6048 for operating a pump so as to draw liquid through the liquid supply passage 6074 and, after sufficient pressure has been built up to overcome the normally closed valve 6052, discharge the liquid through the discharge conduit 6084. The moving member 6048 includes a first plunger 6046 adapted for reciprocating movement in the pump chamber 6066 and a second plunger 6047 adapted for reciprocating movement in the vent chamber 6068. Both plungers are operated by the moving member 6048 as the moving member reciprocates up and down in the chambers. The plungers may be rigidly connected to, or integrally formed with, the moving member.

Figure 27:
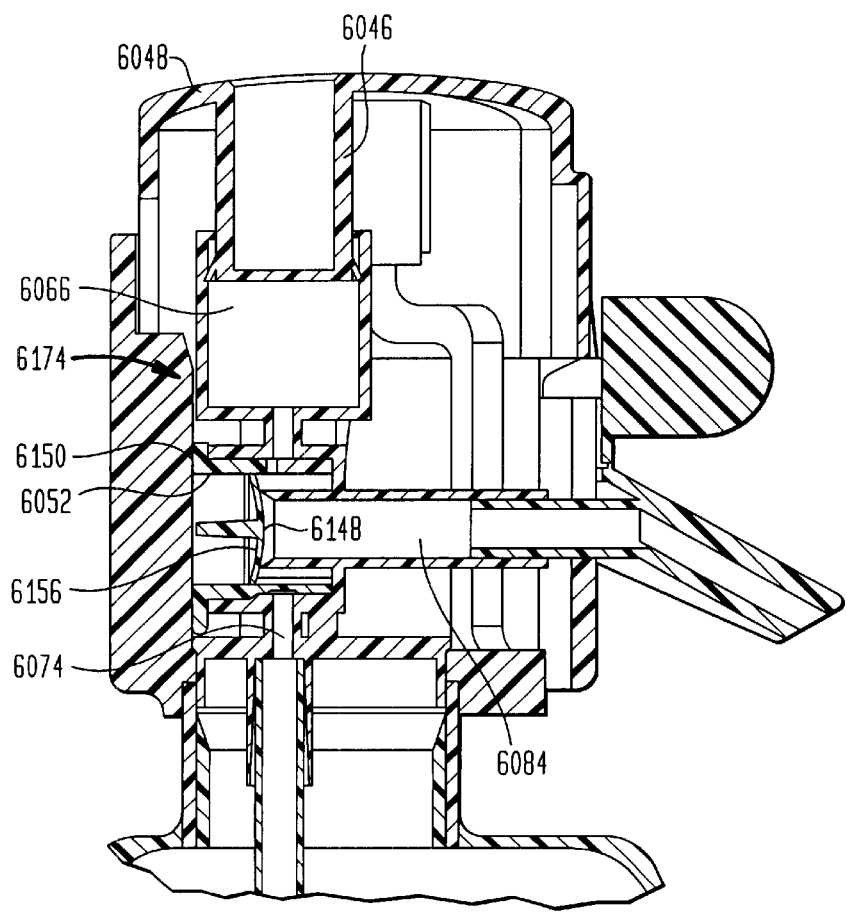
FIG. 27 shows a fragmentary cross-sectional view of the liquid dispenser of FIG. 23 after final assembly thereof.
Figure 26A:
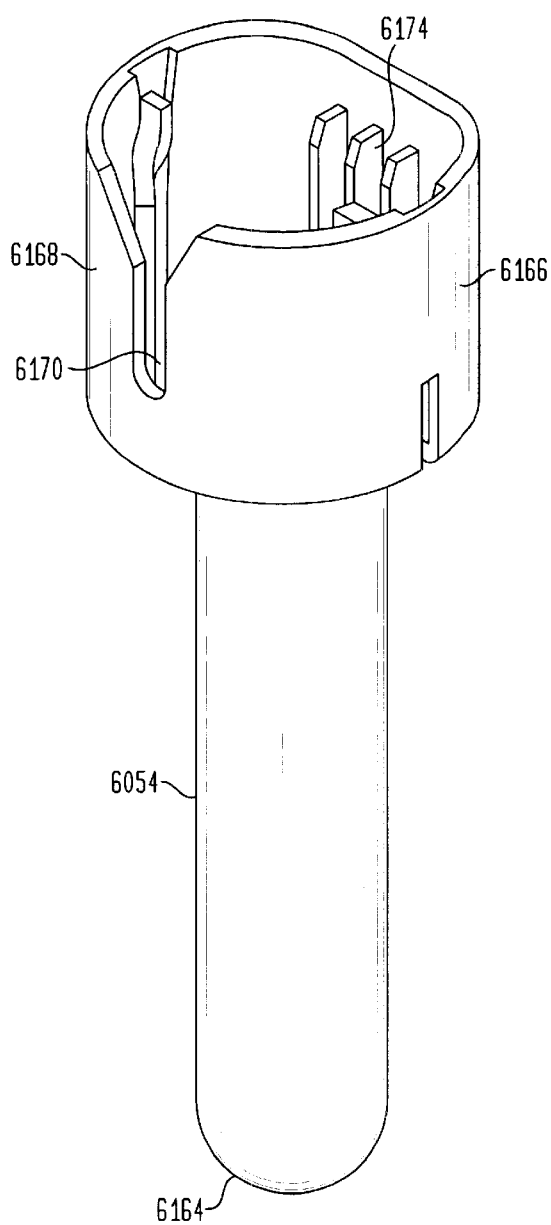
FIG. 26A shows a perspective view of the container shown in FIG. 23.
Figure 26B:
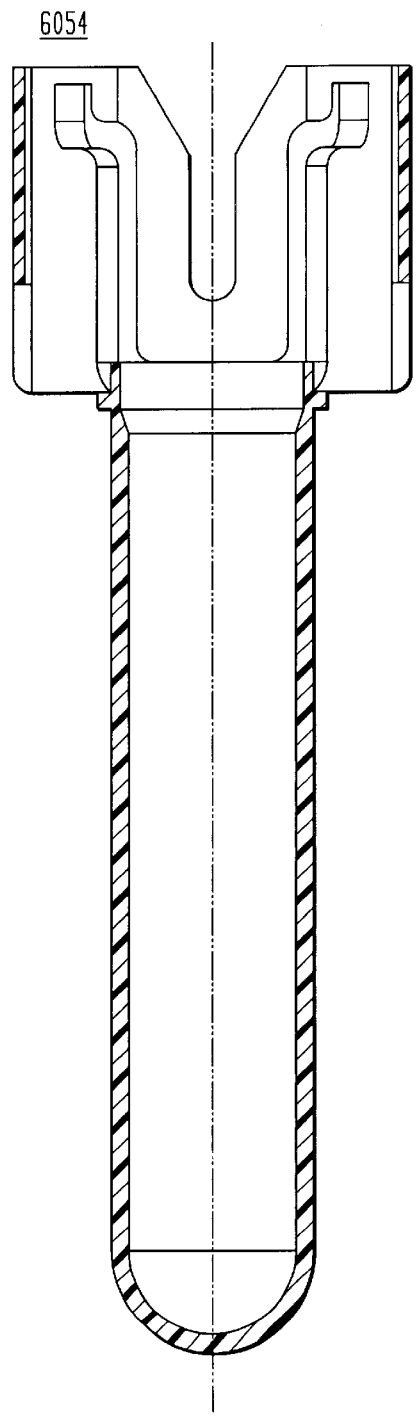
FIG. 26B shows a cross-sectional view of the container shown in FIG. 27A.

Referring to FIGS. 26A and 26B, the container 6054 preferably includes an upper end 6162 and a lower end 6164 remote therefrom. The container has an opening 6056 at its upper end 6162. The opening may be reinforced by a circular ring 6164 integrally molded and/or attached to the upper end of the container. The container includes a shroud 6166 extending upwardly from the upper end thereof. The shroud preferably has a front-end 6168 with a depression 6170 for allowing the discharge outlet 6104 to extend therethrough. The shroud also includes rear support ribs 6174 extending in a direction substantially parallel to the longitudinal axis of the container. Referring to FIGS. 23 and 27, when the housing 6044 is secured to the container, the rear support ribs 6174 closely engage the second end 6150 of the valve 6052. The rear support ribs 6174 of the essentially lock the valve 6052 within the valve chamber 6070 and allow the concave face 6156 of the diaphragm 6148 to be exposed to atmospheric pressure. In certain embodiments, the container may comprise a preform having a test tube shape that is blow molded into its final shape shortly before being filled and assembled with the dispenser subassembly.

Referring to FIGS. 26A–26B and 27, the container 6054 also includes an actuating element preassembled therewith adjacent the opening 6056. The actuating element includes two flexible arms 6178 and 6178 having lower ends 6180 integrally connected to the container 6054 and upper ends 6182 extending away from the container 6054. After assembly, the biasing element 6178 engages the underside of the movable member 6048 for urging the movable member to return to an extended or charged position, as will be described in more detail below.

Reciprocating movement of the movable member 6048 between its two positions also reciprocates the pump plunger 6046 and the vent plunger 6068 in their respective pump and vent chambers. During a suction stroke, the pump plunger moves in an upward direction to create a vacuum in the pump chamber 6066, thereby drawing liquid through liquid supply passage 6074 and into the pump chamber 6066. During a discharge stroke, the pump plunger 6046 moves in a downward direction to reduce the volume of the pump chamber 6066. Once the pressure within the pump chamber is greater than the combined force of the diaphragm 6148 and the ambient pressure on the concave face 6156 of the diaphragm, the diaphragm is forced away from the valve seat 6080 and the liquid is free to pass by the valve seat and into the discharge conduit 6084.

Figure 28:
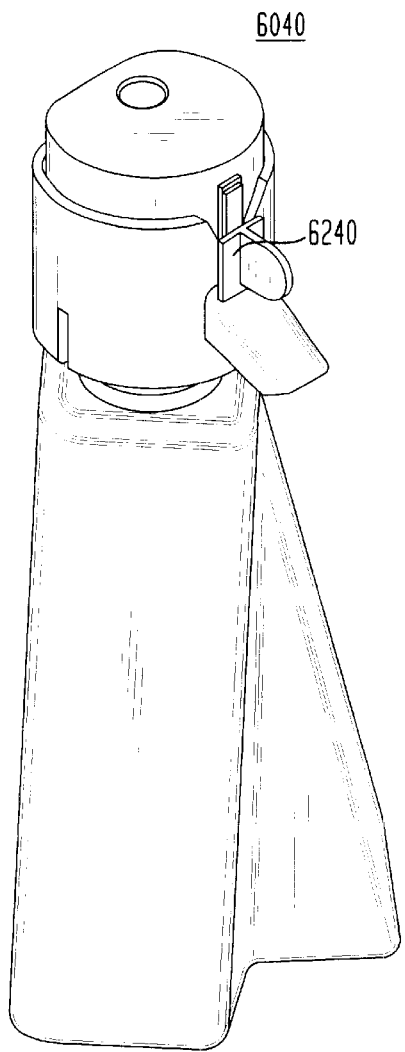
FIG. 28 shows a perspective view of the liquid dispenser of FIG. 27 including a locking element.
Figure 29:
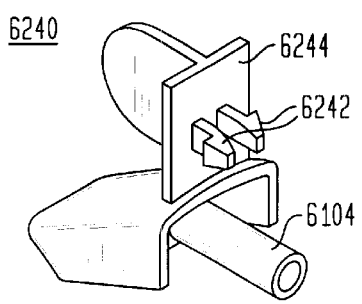
FIG. 29 shows an expanded view of the locking element of FIG. 28.

Referring to FIGS. 28 and 29, the liquid dispenser 6040 also includes a locking element 6240 which prevents unauthorized use of the dispenser or which renders such use detectable. In one embodiment, the locking element 6240 includes two frangible tongues 6242 that is arranged in the path of the movable member 6048 and that are integrally formed with the discharge tube 6104. The tongues 6242 are arranged on a gripping part 6244 that may removed (i.e., torn off) by a user so that the movable member 6048 may be pressed down for operating the liquid dispenser. An inspection of the dispenser before use will reveal tampering if the tongues have already been removed. In other preferred embodiments, the locking element may be integrally formed with the discharge conduit so that the number of parts required for the liquid dispenser may be further reduced. In yet further preferred embodiments, the locking element may include a cover that is hingedly connected to the pump and that closes off the discharge outlet, thereby preventing the operating element from further movement.

Figure 30:
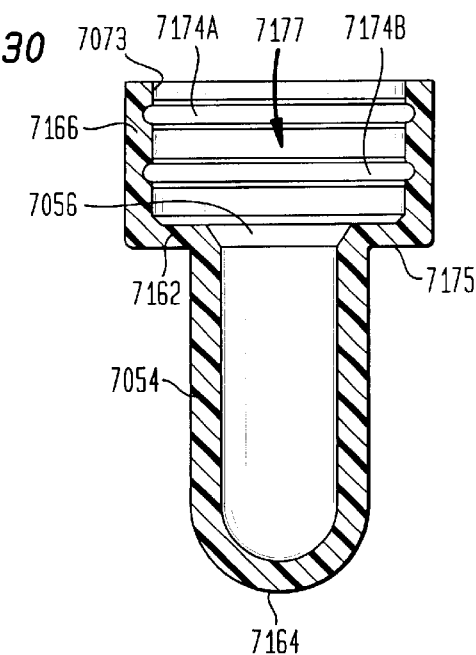
FIG. 30 shows a cross sectional view of a container preform for a liquid dispenser including a neck and at least a part of a dispensing head, in accordance with certain preferred embodiments of the present invention.

Referring to FIG. 30, a liquid dispenser in accordance with further preferred embodiments of the present invention includes a preform 7054, preferably made of a resilient thermoplastic material, that may be blow molded into a container. The preform 7054 has an upper end 7162, a lower end 7164 and a longitudinal axis extending between the upper and lower ends. The preform has an opening 7056 at the upper end 7162 for receiving and/or dispensing a liquid. As mentioned above, the preform is preferably blow molded into a container having a predetermined size and shape before it is filled with a liquid, such as a cleaning product. The preform also includes a shroud or neck 7166 that projects from the upper end 7162 of the preform 7054 and that at least partially surrounds the opening 7056. The neck 7166, which is preferably integrally connected with the upper end of the preform at the opening thereof, has an interior surface 7073 with a first annular groove 7174A and a second annular groove 7174B. The underside 7175 of the neck 7166 includes a substantially flat surface or edge that faces toward the lower end 7164 of the preform 7054. The substantially flat edge provides a surface for securing the preform so that the preform may be suspended in air when it is blow molded, filled with a liquid and/or assembled into a liquid dispenser. The neck 7166 preferably does not change in shape or dimension when the preform is blow molded into a container.

Figure 31:
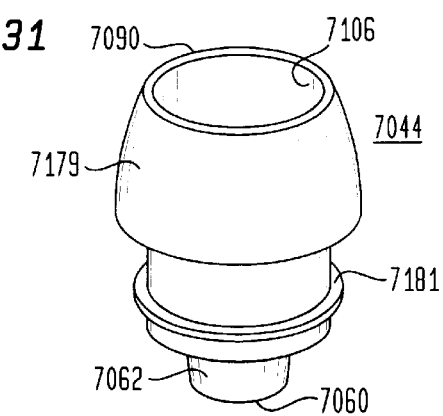
FIG. 31 shows a perspective side view of a remaining part of a dispensing head to be assembled with the container preform of FIG. 30, in accordance with certain preferred embodiments of the present invention.

Referring to FIGS. 30 and 31, the neck 7166 of the preform 7054 has at least a part of a dispenser subassembly connected thereto before a remaining part of the dispenser subassembly 7044 is assembled with the container 7054 during final assembly of the liquid dispenser. The part of the dispenser subassembly connected to the container before final assembly of the liquid dispenser includes a cup-shaped opening 7177 in the neck 7166 that is adapted for receiving the remaining part of the dispenser subassembly 7044. The cup-shaped opening 7177 includes the first and second annular grooves 7174A, 7174B that are engagable with the remaining portion of the dispenser subassembly 7044, as will be described in more detail below.

Figure 32:
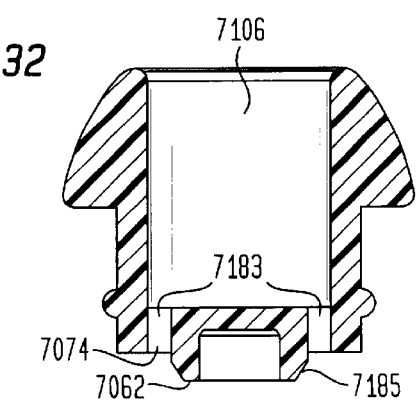
FIG. 32, shows a cross-sectional side view of the remaining part of the dispensing head shown in FIG. 31.

FIGS. 31 and 32 show perspective and cross-sectional views of the remaining part of the dispenser subassembly 7044, respectively. Referring to FIG. 31, the remaining part of the dispenser subassembly 7044 forms a closure for the opening 7056 of the container 7054. The remaining part of the dispenser subassembly 7044 has a cylindrical body with an upper end 7090 and a lower end 7060. The outer surface of the cylindrical body includes an exterior handling edge 7179 at the upper end 7090 thereof, a closing member 7062 at the lower end 7060 thereof, and an annular rib 7181 that extends around the outer surface of the cylindrical body between the handling edge 7179 and the closing member 7062. Referring to FIGS. 31 and 32, the remaining part of the dispenser subassembly includes an inlet 7074, an outlet 7106 and a closing member 7062 which is suspended by ribs 7183 in the middle of the outlet 7106 so as to leave passages around the sides of the closing member 7062. The closing member has a chamfered lower end 7185 that is sized for fitting closely into the opening 7056 in the container 7054.

Figure 33:
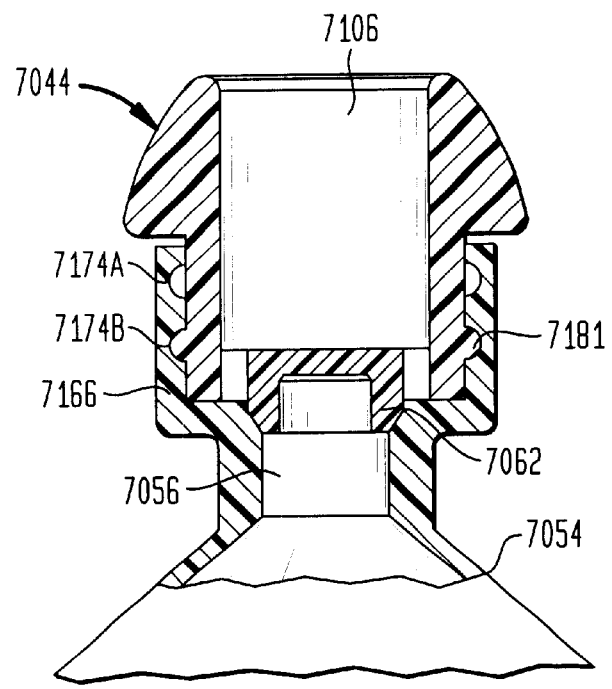
FIG. 33 shows a fragmentary cross-sectional view of a liquid dispenser having a dispensing head in a closed position, in accordance with certain preferred embodiments of the present invention.
Figure 34:
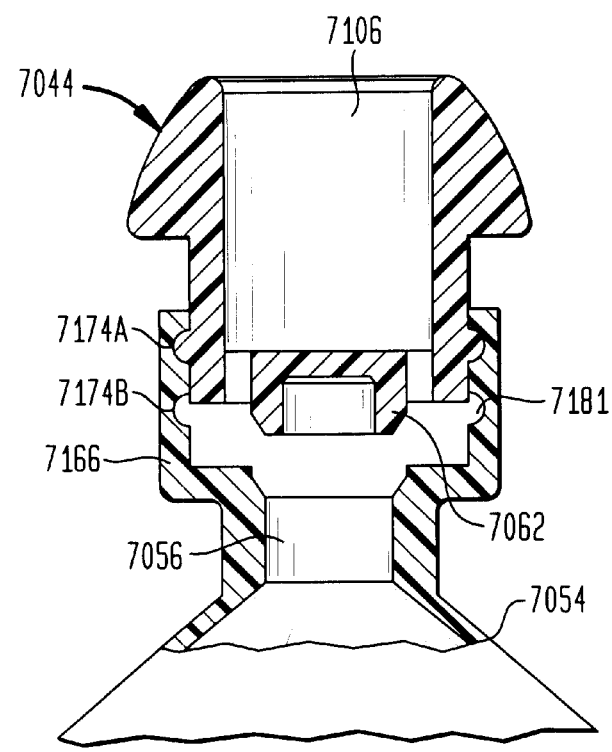
FIG. 34 shows a fragmentary cross-sectional view of the liquid dispenser of FIG. 33 having the dispensing head in the open position.

Referring to FIGS. 33 and 34, after the preform 7054 has been blow molded into a container 7054 and filled with a liquid, the remaining part of the dispenser subassembly 7044 is assembled with the container. Referring to FIG. 33, the remaining part of the dispenser subassembly 7044 is snap-fit into the cup-shaped opening of the neck 7166 so that the external rib 7181 of the cylindrical body engages the second annular groove 7174B of the neck. In this position, the closing member 7062 abuts against the container opening 7056 for closing the outlet 7106 of the remaining part of the dispenser subassembly 7044. When the closing member is in the closed position, liquid can not be dispensed through the opening of the container.

When it is desirable to dispense liquid from the container, the remaining part of the dispenser subassembly 7044 is moved to the "open" position shown in FIG. 34. In this position, the external rib 7181 of the cylindrical body is captured within the first annular groove 7174A of the neck 7166. In this position, the closing member 7062 is not in contact with the opening 7056 of the container 7054 so that liquid may flow through the container opening, 7056 past the closing member 7062, and be dispensed from the outlet 7106.

Figure 35:
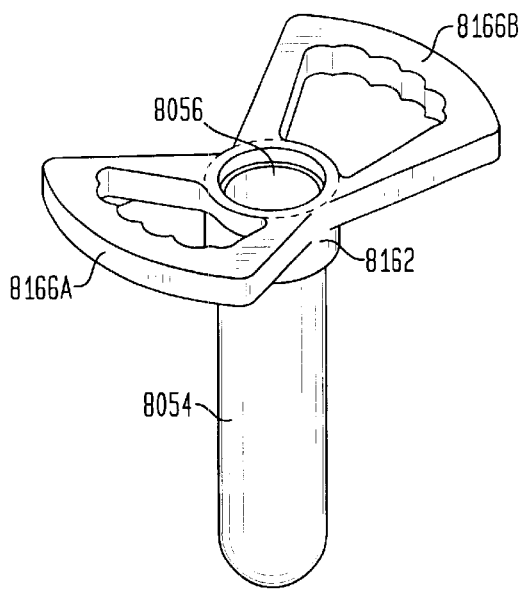
FIG. 35 shows a perspective view of a container preform for a liquid dispenser, in accordance with further preferred embodiments of the present invention.
Figure 36:
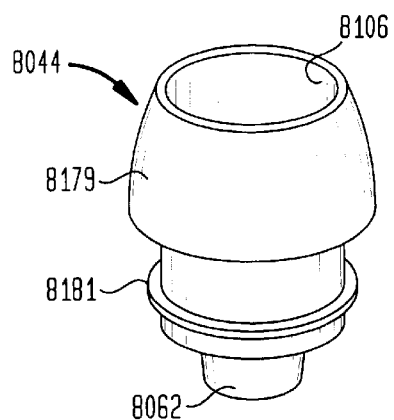
FIG. 36 shows a perspective side view of a remaining part of a dispensing head to be assembled with the preform of FIG. 35.
Figure 37:
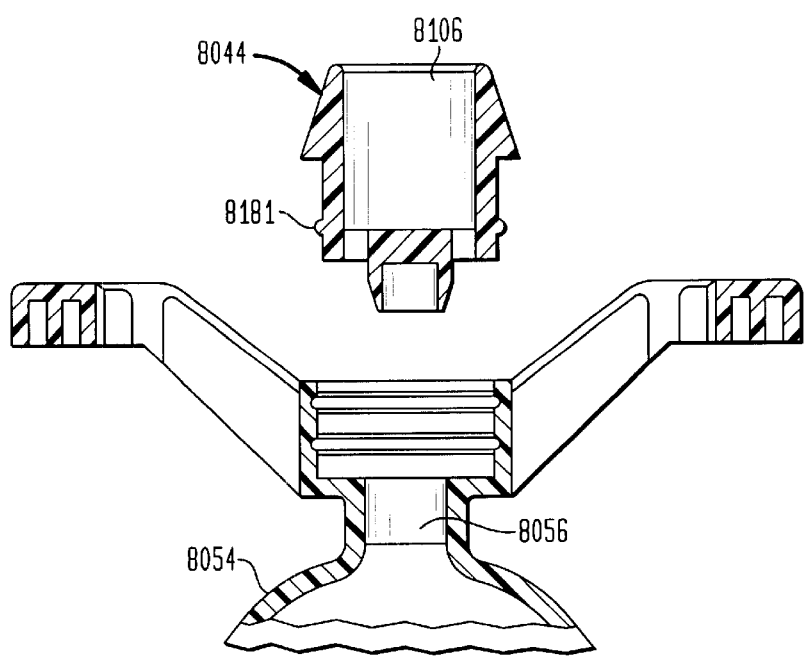
FIG. 37 shows a fragmentary cross-sectional view of the remaining part of the dispensing head of FIG. 36 and the preform of FIG. 35.
Figure 38:
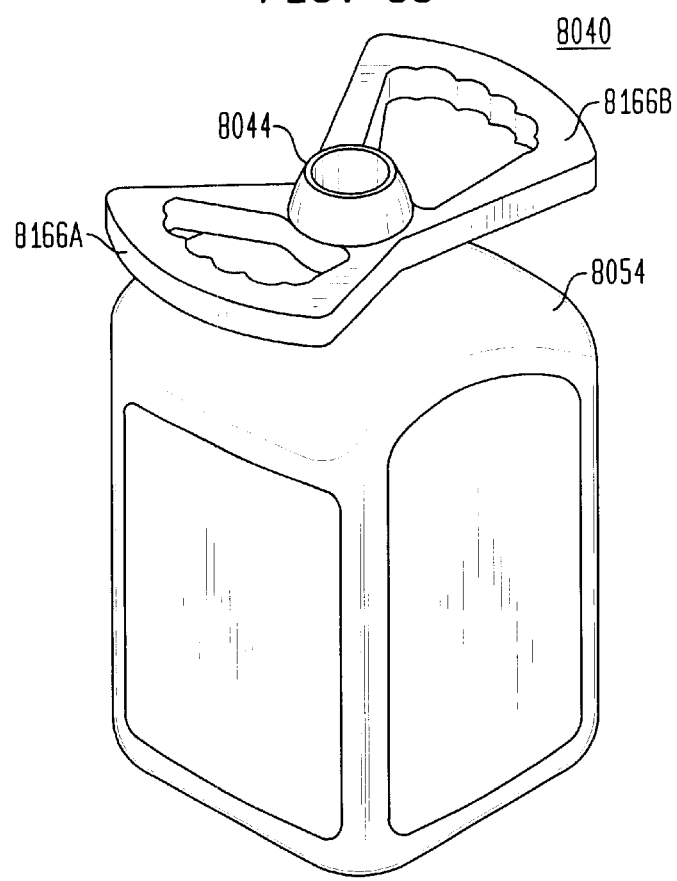
FIG. 38 shows a perspective view of the subassembly shown in FIG. 37 after the remaining part of the dispensing head has been assembled with the container.
Figure 39:
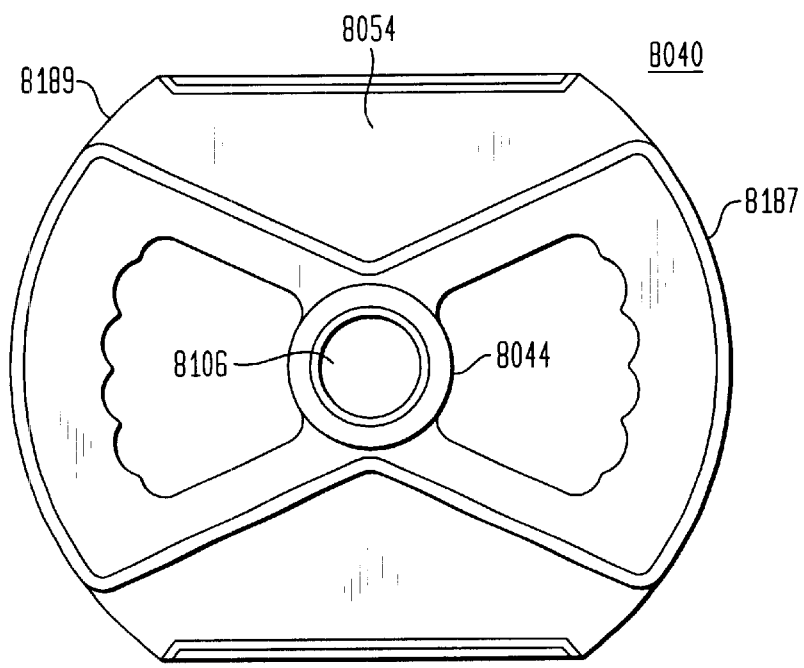
FIG. 39 shows a top view of the liquid dispenser shown in FIG. 38.
Figure 40:
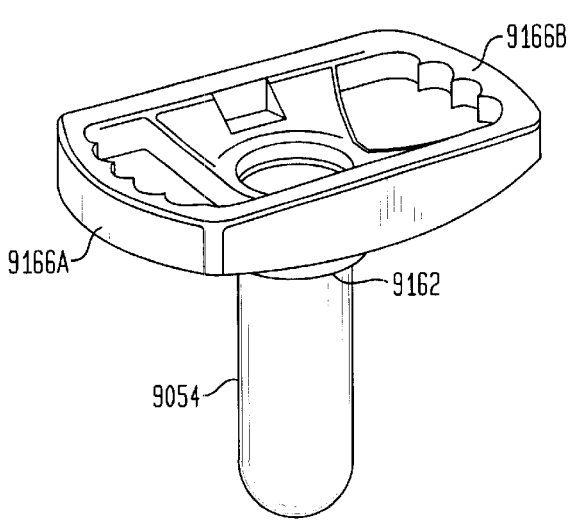
FIG. 40 shows a perspective view of a container preform, in accordance with still further preferred embodiments of the present invention.
Figure 41:
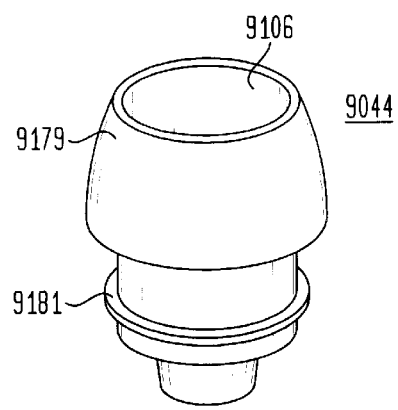
FIG. 41 shows a perspective view of a remaining portion of a dispensing head, in accordance with certain preferred embodiments of the present invention.

FIGS. 35 through 39 show another preferred embodiment of the present invention. Referring to FIGS. 35 and 36, the preform 8054 and the remaining part of the dispenser subassembly 8044 is substantially similar to the embodiment shown in FIGS. 30 and 31, except that the preform 8054 has at least one handle 8166 connected thereto. Referring to FIG. 35, the preform includes two handles 8166A, 8166B projecting from an upper end 8162 of the preform 8054, adjacent the opening 8056 thereof. The two handles 8166A, 8166B are integrally formed with the container 8054 and are adapted for handling and moving relatively large liquid dispenser capable of storing several liters of a liquid, such as beer or wine. In other preferred embodiments, the preform may have more than two handles. FIG. 37 shows the remaining part of the dispenser subassembly 8044 of FIG. 36 being assembled with the preform 8054 of FIG. 35, after the preform has been blow molded into a container and filled with a liquid. The exterior rib 8181 of the remaining part of the dispenser subassembly 8084 is snap-fit into one of the internal grooves 8174 in the cup-shaped portion 8177 of the neck 8166. FIG. 38 shows a perspective view of the liquid dispenser 8040 after final assembly thereof. FIG. 39 shows a top view of the liquid dispenser of FIG. 38. The peripheral edges 8187 of the handles 8166A, 8166B preferably do not extend beyond the outer surface 8189 of the container 8054. This allows the fully assembled liquid dispensers to be stored side-by-side without the handles taking up extra storage space.

Figure 42:
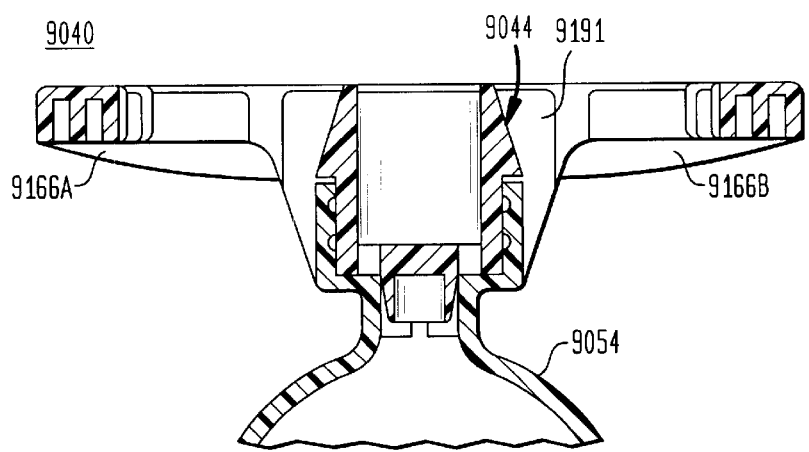
FIG. 42 shows a cross-sectional view of a liquid dispenser after the remaining portion of the dispensing head has been assembled with the container preform of FIG. 40.
Figure 43:
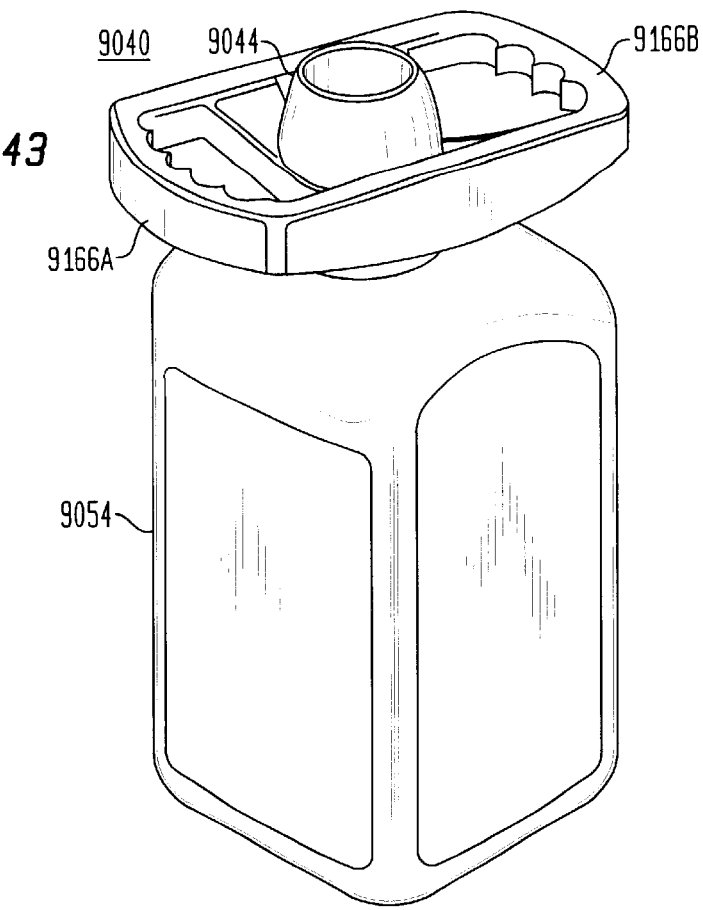
FIG. 43 shows a perspective view of the liquid dispenser shown in FIG. 42.
Figure 44:
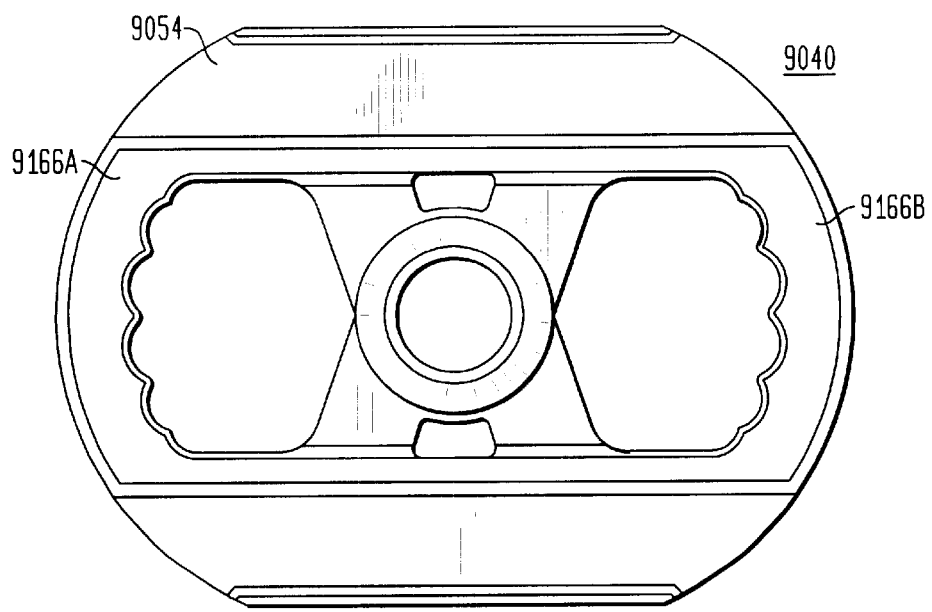
FIG. 44 shows a top view of the liquid dispenser shown in FIG. 43.

FIGS. 40–44 show yet another preferred embodiment of a liquid dispenser whereby the container 9054 has handles 9166A, 9166B integrally molded to an upper end 9162 of the container 9054. Referring to FIG. 42, the handles 9166 are integrally connected with the upper end 9162 of the container 9054 and includes a recess that surrounds the remaining part of the dispenser subassembly 9044 when the subassembly is in the closed position (FIG. 42). As a result, the handles 9166A, 9166B surround the remaining part of the dispenser subassembly 9044 to prevent the dispensing portion of the liquid dispenser 9040 from being damaged during movement or in storage.

Figure 45:
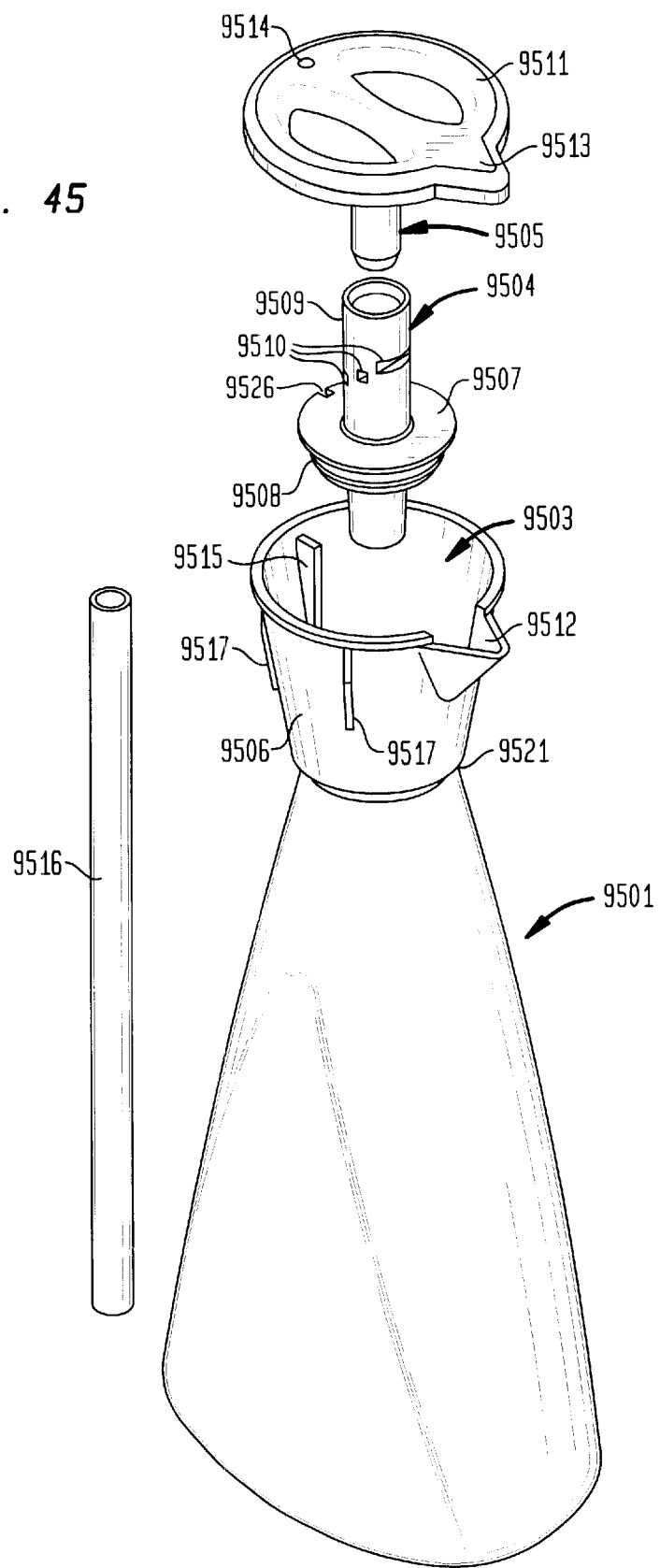
FIG. 45 shows an exploded view of a liquid dispenser including a container having a dosing chamber, a dosing device and a cover, in accordance with further preferred embodiments of the present invention.

FIGS. 45–50 show a liquid dispenser in accordance with further embodiments of the present invention. Referring to FIGS. 45 and 46, a container 9501 for a liquid dispenser for dispensing a specific dose or quantity of a liquid includes a dosing chamber 9503 having at least one side wall 9506 integrally connected with the container 9501. The dosing chamber 9503 is adapted and sized for receiving a dosing member 9504 which is in communication with the interior of the container by means of a dip tube 9516 which is placed in the underside 9523 of the dosing member 9504 and extends to a position close to the bottom 9518 of the container 9501. The dosing member 9504 is fixed to or formed integrally with a disc like part 9507 which functions as a bottom of the dosing chamber 9503. This disc-like part 9507 is provided with a skirt 9508 which is arranged along the periphery thereof and which is sized to sealingly engage a relatively narrow neck 9521 located between an upper end of the container 9501 and the dosing chamber 9503. The disc-like part 9507 is further provided with a longitudinal groove 9526 which is intended to be positioned around a longitudinal rib 9528 extending into the dosing chamber 9503 so as to prevent the disc-like part 9507 form rotating in the dosing chamber 9503.

Figure 47:
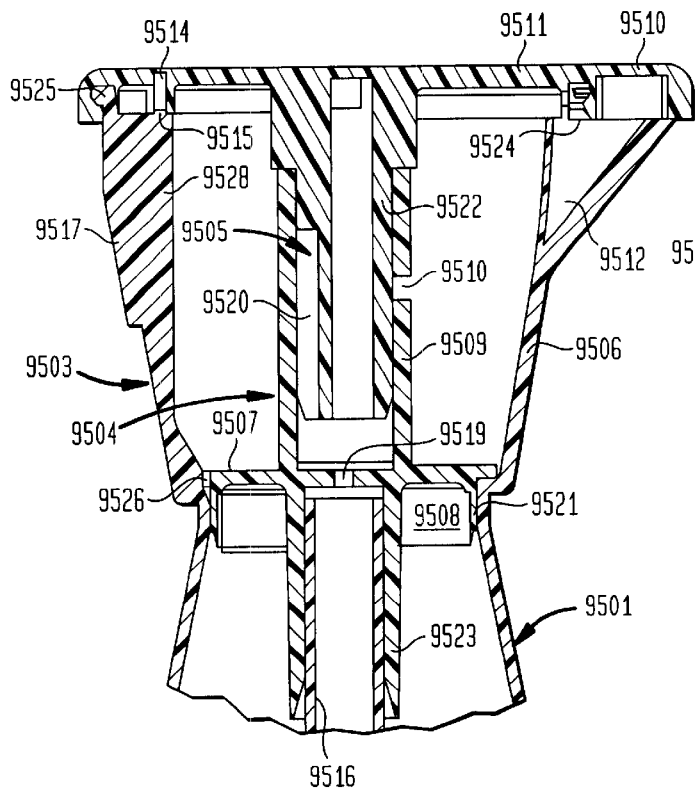
FIG. 47 shows an enlarged cross-sectional view of a portion of the liquid dispenser shown in FIG. 46.
Figure 49:
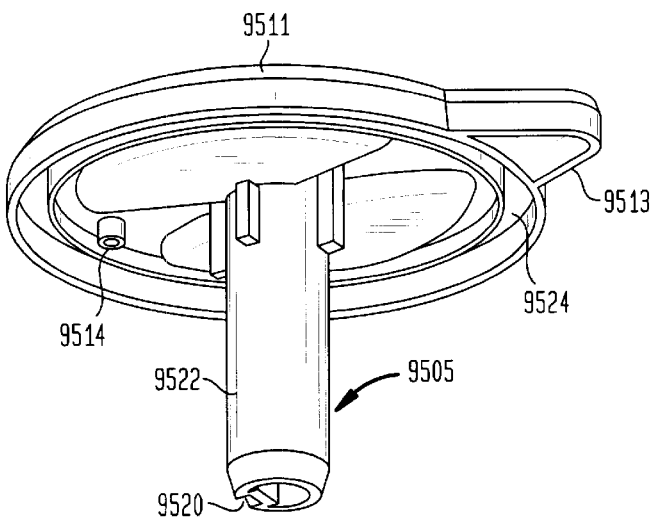
FIG. 49 shows a perspective view of the cover shown in FIG. 45.

The liquid dispenser also includes a cover 9511 which closes the dosing chamber 9503 at the top and that is rotatable relative to the dosing chamber. The cover 9511 has a second member 9505 that is connected to or formed integrally with the cover 9511. The second member 9505 projected downwardly from the cover and is adapted for being rotatably received in the dosing member 9504. Referring to FIGS. 47 and 49, the cover 9511 can be fixed to the upper end of the container by means of a snap connection 9524, 9525 that engages the at least one wall 9506 of the dosing chamber 9503.

Figure 48:
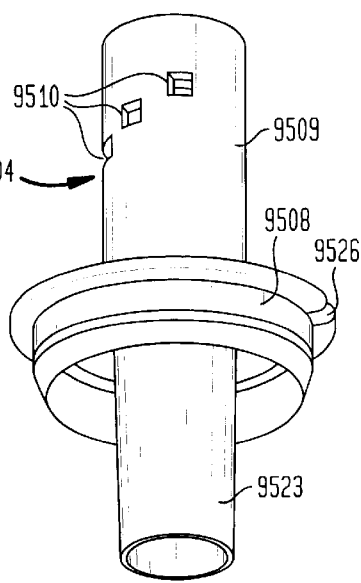
FIG. 48 shows a perspective view of the dosing device shown in FIG. 45.

Referring to FIGS. 46–48, the dosing member 9504 has a cylindrical body 9509 having a number of outlet openings 9510 extending therethrough that are arranged at different heights. The cylindrical second member 9505 extending from the underside of the cover 9505 is provided with a channel 9520 which is recessed into its cylinder wall 9522 and which can be placed in registration with one of the outlet openings 9510 of the dosing member 9504 by rotating the cylindrical second member 9505 relative to the dosing member 9504.

In the position shown in FIGS. 46 and 47, the channel 9520 of the second member 9505 is not in registration with one of the outlet openings 9510 of the dosing member 9504.

As a result, there is no liquid or fluid communication between the liquid or fluid in the container 9501 and the dosing chamber 9503. In addition, in this position, the cover has a triangular protruding part 9513 that covers or seals off an outlet opening or spout 9512 of the dosing chamber 9503. As a result, leakage of liquid from the spout 9512 is wholly prevented. Referring to FIGS. 45, 47 and 49, the cover 9511 has a venting aperture 9514. When the dosing device 9502 is in the open position, the venting aperture 9514 ensures that air can penetrate into the dosing chamber 9503 as the dosing chamber is emptied. When the dosing device is in the closed position shown in FIGS. 46 and 47, the venting aperture 9514 is closed by cam 9515 that is arranged on the upper edge of rib 9528 protruding from side wall 9506 into the dosing chamber 9503.

The dosing device 9502 is operated as follows. The dosing devices is preferably initially in the closed position shown in FIGS. 46 and 47. The cover 9511 is then rotated which, in turn, rotates the second member 9505 connected thereto. As the cover rotates, the dosing member 9504 is prevented from rotating by rib 9528 engaging groove 9526 (FIG. 48) in the dosing device. The cover is rotated until the second member 9505 is placed in registration with one of the outlet openings 9510 of the dosing member 9504, whereby fluid communication is established between the liquid in the container 9501 and the dosing chamber 9503. Markings 9517 arranged about the sidewall 9506 of the dosing chamber 9506 indicate when the relevant position lies precisely in registration with the triangular closing part 1953 of the cover 9511. If the container 9501 is squeezed in this position, liquid is suctioned through the immersion tube 9516 and through an opening 9519 in the bottom of dosing chamber 9503. The liquid then continues on to the dosing member 9504 and then flows via channel 9520 and one of the aligned outlet openings 9510 into the dosing chamber 9503. The container 9501 must be squeezed for a sufficient amount of time so that the liquid level in the dosing chamber 9503 lies above the relevant outlet opening 9510. If the container 9501 is then released, liquid will then be suctioned back, as a result of the under pressure prevailing therein, from the dosing chamber 9503 via outlet opening 9510 and channel 9520 to immersion tube 9516 and finally to the container 1. This return suction takes place for as long as outlet opening 9510 lies below the top surface of the liquid in the dosing chamber 9503. When the liquid level in the dosing chamber 9503 reaches the top of outlet opening 9510, air will then be drawn in, whereupon further suctioning of liquid from dosing chamber back to the container 9501 ceases. At that moment, a precise dose or quantity of liquid remains in the dosing chamber 9503. The precise dose can subsequently be poured from the dosing chamber through spout 9512.

The container 9501 and the dosing chamber 9503 are preferably formed integrally with one another. In the preferred embodiment shown in FIGS. 45–50, both the container and the dosing chamber are injection molded in one process, and preferably in one step. Referring to FIG. 50, in preferred embodiments, the container 9501 is not immediately injection molded into its final form. Instead, the container is preformed into a shape that may be described as having a "test tube" shape. The test tube shaped preform 9527 will initially take up little space, whereby the costs of storage and transport are limited. When the container must eventually be filled and connected to the other components of dosing device 9502, the preform 9527 is blow molded into a container having the shape shown in FIG. 45. The formed container 9501 can then be filled with a liquid and the other components, namely the dosing device 9504 and the cover 9505, can be pressed or snapped fixedly onto the container 9501 and the dosing chamber 9503. After the dosing device 9504 and the cover 9505 have been assembled with the container 9501 and the dosing chamber 9503, the liquid dispenser is ready for dispensing precisely metered doses of a liquid. A wide variety of blow molding techniques and instruments may be used when blow molding the preformed containers to produce containers having various shapes and sizes, thereby enabling flexible production. Thus, the embodiment of the present invention shown in FIGS. 45–50 enables integral forming of a container with at least a part of the dosing device in a simple manner and with a small number of components. As a result, assembly operations are greatly simplified and possible problems in respect of sealing are prevented.

Although the invention has been illustrated by means of a number of examples, it should be apparent that it is not limited thereto. For example, other parts of the dispenser subassembly head might be integrated with the container, such as the pump chamber. Moreover, the container might be blow molded at a different location than at the final filling and assembly line. Furthermore, the flexible diaphragm and sleeve of the spring valve could be formed separately. In addition, spring valve may not include a stop member in some instances and the choice of materials might be varied as well. Accordingly, the scope of the invention is defined solely by the appended claims.

What is claimed is:

1. A liquid dispenser comprising:
    a dispenser subassembly comprising an inlet, an outlet, and a pump in fluid communication with the inlet and the outlet, said pump being movable between a first charged position and a second discharged position; and
    a container including an opening for receiving a liquid and having an actuating element connected to said container, said actuating element being engagable with said dispenser subassembly when said container and said dispenser subassembly are assembled together, wherein engagement of said actuating element with said dispenser subassembly is a prerequisite for operating said pump and dispensing the liquid from said dispenser, and wherein said actuating element urges said pump into the first charged position.

2. The liquid dispenser as claimed in claim 1, wherein said actuating element is integrally connected to said container.

3. The liquid dispenser as claimed in claim 1, wherein said actuating element is integrally molded to said container.

4. The liquid dispenser as claimed in claim 1, wherein said container and said actuating element comprise resilient thermoplastic material.

5. The liquid dispenser as claimed in claim 4, wherein said actuating element includes a biasing element engagable with said dispenser subassembly for urging said pump into one of the first and second positions.

6. The liquid dispenser as claimed in claim 5, wherein said biasing element is connected to said container adjacent the opening.

7. The liquid dispenser as claimed in claim 6, wherein said container has a longitudinal axis and said biasing element extends in a direction substantially parallel to the longitudinal axis.

8. The liquid dispenser as claimed in claim 7, wherein said biasing element includes two legs having first ends connected to said container and second ends remote therefrom.

9. The liquid dispenser as claimed in claim 8, wherein the two legs have intermediate sections extending away from the opening of said container.

10. The liquid dispenser as claimed in claim 9, wherein the second ends of said legs include a curved portion.

11. The liquid dispenser as claimed in claim 8, wherein the two legs of said biasing element are substantially parallel to one another.

12. The liquid dispenser as claimed in claim 6, wherein said container has a longitudinal axis and said biasing element extends in a direction substantially perpendicular to the longitudinal axis.

13. The liquid dispenser as claimed in claim 12, wherein the biasing element comprises one or more flexion springs.

14. The liquid dispenser as claimed in claim 1, wherein said container includes a shroud extending away from and at least partially surrounding the opening.

15. The liquid dispenser as claimed in claim 14, wherein said shroud is engagable with said dispenser subassembly when said dispenser subassembly and said container are assembled together.

16. The liquid dispenser as claimed in claim 15, wherein said shroud includes an exterior surface having a grippable surface for facilitating operation of the pump.

17. The liquid dipenser as claimed in claim 16, wherein the actuating element includes the exterior surface of the shroud.

18. The liquid dispenser as claimed in claim 17, wherein the actuating element further comprises a biasing element connected to said container.

19. The liquid dispenser as claimed in claim 18, wherein said shroud includes a lower end integrally connected with said container adjacent the opening and an upper end remote therefrom.

20. The liquid dispenser as claimed in claim 19, wherein said shroud includes a front, a rear and two side sections extending between the front and the rear.

21. The liquid dispenser as claimed in claim 20, wherein the side sections of said shroud include one or more slots extending between the interior surface and the exterior surface thereof.

22. The liquid dispenser as claimed in claim 19, wherein the dispenser subassembly includes one or more peripheral tabs and the shroud includes one or more slots sized to receive the tabs so that the dispenser subassembly may be secured to the shroud.

23. The liquid dispenser as claimed in claim 19, wherein the front of the shroud is adjacent the biasing element and the rear of the shroud is remote therefrom.

24. The liquid dispenser as claimed in claim 23, wherein the shroud includes an interior surface surrounding the container opening and the biasing element.

25. The liquid dispenser as claimed in claim 1, wherein said dispenser subassembly comprises a housing including the inlet for drawing the liquid into said housing and the outlet for discharging the liquid from said housing.

26. The liquid dispenser as claimed in claim 25, wherein said housing has a front, a rear, two lateral sides extending between the front and the rear, an upper end and a lower end.

27. The liquid dispenser as claimed in claim 26, wherein said housing includes said pump comprising a pump chamber having a first end facing the front of the housing, a second end remote therefrom, and an interior wall extending between the first and second ends thereof.

28. The liquid dispenser as claimed in claim 26, wherein the first end of the pump chamber is open and the second end of the pump chamber is substantially closed.

29. The liquid dispenser as claimed in claim 28, wherein said pump further comprises a piston movable between the first and the second ends of said pump chamber.

30. The liquid dispenser as claimed in claim 29, wherein the liquid dispenser is in a charged position when the piston is at the first end of the pump chamber and is in a discharged position when the piston is at the second end of the pump chamber.

31. The liquid dispenser as claimed in claim 29, wherein the liquid is drawn into the pump chamber when piston moves from the second position to the first position.

32. The liquid dispenser as claimed in claim 31, wherein the liquid is discharged from the pump chamber when the piston moves from the first position to the second position.

33. The liquid dispenser as claimed in claim 29, wherein said piston includes a piston rod having first and second annular sealing elements adapted for engaging the interior wall of said pump chamber.

34. The liquid dispenser as claimed in claim 29, said dispenser subassembly further comprising a movable member connected to said piston.

35. The liquid dispenser as claimed in claim 34, wherein the actuating member engages said movable member when said dispenser subassembly and said container are assembled together for urging said movable member and said piston toward the first pump position.

36. The liquid dispenser as claimed in claim 35, wherein the movable member comprises a trigger having an upper end, a lower end and a mid-section between the upper and lower ends.

37. The liquid dispenser as claimed in claim 36, wherein the upper end of the trigger is hingedly connected to said housing and the mid-section of said trigger is pivotally connected to said piston.

38. The liquid dispenser as claimed in claim 37, wherein said trigger includes an aperture between the mid-section and the upper end thereof, and wherein the outlet of said housing extends through the trigger aperture when the trigger is connected to said housing.

39. The liquid dispenser as claimed in claim 38, wherein the trigger includes a rear surface having one or more channels formed therein for engaging the actuating element, wherein the actuating element urges the trigger and the piston pivotally connected thereto toward the first charged position.

40. The liquid dispenser as claimed in claim 26, further comprising a nozzle rotatably secured to the outlet.

41. The liquid dispenser as claimed in claim 26, wherein said dispenser subassembly includes a precompression system being operable to allow liquid entering the inlet to reach the outlet only after a predetermined pressure is established in the pump chamber and to stop the liquid from reaching the outlet when the pressure in the pump chamber falls below the predetermined pressure.

42. The liquid dispenser as claimed in claim 41, wherein the precompression system includes a valve chamber formed in the housing having a first end facing the rear of said housing, a second end remote therefrom, and an interior wall extending between the first and second ends thereof.

43. The liquid dispenser as claimed in claim 42, wherein the second end of said valve chamber includes an end wall having a valve seat and an opening extending through the center of said valve seat.

44. The liquid dispenser as claimed in claim 43, wherein the end wall at the second end of the valve chamber includes an opening in fluid communication with the pump chamber.

45. The liquid dispenser as claimed in claim 44, wherein the precompression system further comprises a spring valve having a flexible diaphragm engagable with the valve seat.

46. The liquid dispenser as claimed in claim 45, wherein said spring valve has a first end including the flexible diaphragm, a second end remote therefrom, and an exterior sleeve extending between the first and second ends.

47. The liquid dispenser as claimed in claim 46, wherein the flexible diaphragm includes a convex surface facing the valve seat and a concave surface facing away from the valve seat.

48. The liquid dispenser as claimed in claim 47, wherein the convex face of the diaphragm is in fluid communication with the pump chamber.

49. The liquid dispenser as claimed in claim 48, wherein the convex face of the diaphragm is forced away from the seat valve opening when the pressure within the pump chamber is greater than the combined spring force of the diaphragm and the force of the atmospheric pressure at the concave face of the diaphragm.

50. The liquid dispenser as claimed in claim 47, wherein the diaphragm is dome-shaped.

51. The liquid dispenser as claimed in claim 47, wherein a stop member is integrally formed with the diaphragm.

52. The liquid dispenser as claimed in claim 51, wherein the stop member is formed at the concave face of the diaphragm.

53. The liquid dispneser as claimed in claim 47, wherein the flexible diaphragm is engagable with the valve seat and normally closes the opening in the valve seat.

54. The liquid dispenser as claimed in claim 53, wherein the diaphragm is in substantial alignment with the outlet of said housing.

55. The liquid dispenser as claimed in claim 47, wherein the housing includes a liquid supply opening between the inlet and the pump chamber for providing fluid communication between the pump chamber and the inlet.

56. The liquid dispenser as claimed in claim 55, wherein at least a portion of the exterior sleeve of the valve is engagable with the interior wall of the valve chamber.

57. The liquid dispenser as claimed in claim 56, wherein the valve includes a peripheral flap projecting from the first end of the valve, wherein the peripheral flap covers the liquid supply opening between the liquid inlet and the pump chamber.

58. The liquid dispenser as claimed in claim 57, wherein the peripheral flap is flexible and inclines toward the interior wall of the valve chamber.

59. The liquid dispenser as claimed in claim 58, wherein the peripheral flap seals the liquid supply opening when the piston moves from the first position to the second position.

60. The liquid dispenser as claimed in claim 59, wherein the peripheral flap isolates the liquid in the pump chamber from the exterior sleeve of the spring valve when the piston moves from the first position to the second position.

61. The liquid dispenser as claimed in claim 59, wherein the peripheral flap is movable away from the liquid supply opening when the piston moves from the second position to the first position so that the liquid may be drawn into the pump chamber.

62. The liquid dispenser as claimed in claim 58, wherein the peripheral flap is engagble with the interior wall of the valve chamber during a discharge stroke and is remote from the interior wall during a suction stroke.

63. The liquid dispenser as claimed in claim 46, wherein the container includes a shroud extending away from and at least partially surrounding the opening of said container.

64. The liquid dispenser as claimed in claim 63, wherein said shroud includes an interior surface engaging said dispenser subassembly when said dispenser subassembly and said container are assembled together, wherein the interior surface of said shroud contacts the second end of said spring valve for securing said spring valve within said valve chamber.

65. The liquid dispenser as claimed in claim 26, wherein the lower end of said housing includes a base adapted for being secured within the opening of said container.

66. The liquid dispenser as claimed in claim 11, further comprising a tube connected to the liquid inlet for drawing the liquid from the container and into the pump chamber.

67. The liquid dispenser as claimed in claim 1, wherein the actuating element includes a shroud extending above and at least partially surrounding the opening of said container.

68. The liquid dispenser as claimed in claim 67, wherein the shroud at least partially surrounds the dispenser subassembly when the subassembly is secured within the opening of said container.

69. The liquid dispenser as claimed in claim 68, wherein the shroud has an inner dimension that substantially coincides with the outer dimension of said dispenser subassembly.

70. The liquid dispenser as claimed in claim 68, wherein the shroud includes an exterior surface that is grippable for facilitating operation of said dispenser.

71. The liquid dispenser as claimed in claim 68, wherein the actuating element includes a substantially flat wall connected to the shroud for engaging the second end of the valve.

72. The liquid dispenser as claimed in claim 1, wherein the dispenser subassembly includes a top having a substantially flat upper surface.

73. The liquid dispenser as claimed in claim 72, wherein the substantially flat upper surface includes an indicia bearing surface.

74. A liquid dispenser comprising:
a dispenser subassembly; and
a container subassembly having an opening for receiving a liquid, said container subassembly adapted to be assembled with said dispenser subassembly, said container subassembly including integral therewith a shroud extending away from and at least partially surrounding the opening adapted to cooperate with and form at least a portion of a housing for the dispenser subassembly when said dispenser subassembly and said container subassembly are assembled together.

75. The liquid dispenser as claimed in claim 74, further comprising an actuating element connected to the container subassembly and being engagable with said dispenser subassembly when said container subassembly and said dispenser subassembly are assembled together.

76. The liquid dispenser as claimed in claim 74, further comprising an actuating element connected to said dispenser subassembly.

77. A liquid dispenser comprising:
a dispenser subassembly comprising:
an inlet for drawing liquid into the subassembly;
an outlet for discharging liquid from the subassembly;
a pump including a pump chamber and a piston movable within the pump chamber between a first charged pump position and a second discharged pump position,
a movable element in contact with said pump for moving said pump between one of the first and second positions; and
a container including an opening adapted for securing at least a portion of said dispenser subassembly therein, wherein said container includes an actuating element engagable with said movable element for urging said pump into one of the first and second pump positions, wherein engagement of said moveable element with said actuating element is a prerequisite for operating said pump and dispensing the liquid from said dispenser subassembly, and wherein said actuating element urges said pump into said first charged position.

78. The liquid dispenser as claimed in claim 77, wherein the dispenser subassembly includes a housing having a pump chamber and a vent chamber adjacent the pump chamber.

79. The liquid dispenser as claimed in claim 78, wherein the dispenser subassembly includes a movable element having a first piston and a second piston integrally connected thereto, wherein the first piston has an outer dimension sized for closely engaging an internal wall of the pump chamber and the second piston has an outer dimension sized for closely engaging an internal wall of the vent chamber.

80. The liquid dispenser as claimed in claim 79, wherein the movable element is movable between a first position and a second position, wherein the movable member is closer to the container in the second position than in the first position.

81. The liquid dispenser as claimed in claim 80, wherein the pistons move together simultaneously between the first and second pump positions.

82. The liquid dispenser as claimed in claim 81, further comprising a locking element cooperating with the movable element for selectively preventing movement of the movable element toward the second pump position.

83. The liquid dispenser as claimed in claim 82, wherein the locking element includes a frangible tongue connected with the liquid outlet.

84. The liquid dispenser as claimed in claim 83, wherein the locking element further comprises a cover for closing the outlet.

85. A liquid dispenser comprising:
a container having an opening;
an actuating element connected to the container; and
a dispenser subassembly connected to the opening of said container, said dispenser subassembly including a pump, wherein engagement of the dispenser subassembly by the actuating element is a prerequisite for operating the pump, and wherein said actuating element urges said pump into a first charged position.

* * * * *

UNITED STATES PATENT AND TRADEMARK OFFICE
CERTIFICATE OF CORRECTION

PATENT NO.    : 6,364,172 B1
DATED         : April 2, 2002
INVENTOR(S)   : Wilhelmus Johannes Maas and Petrus Lambertus Hurkmans It is certified that error appears in the above-identified patent and that said Letters Patent is hereby corrected as shown below:

Title page,
Item [57], insert new ABSTRACT:

-- ABSTRACT OF THE DISCLOSURE

A liquid dispenser includes a dispenser subassembly having an inlet, an outlet, and a pump and fluid communication with the inlet and the outlet, the pump being movable between a first charged position and a second discharged position. The liquid dispenser also includes a container having an opening for receiving a liquid and having an actuating element connected to the container, the actuating element being engageable with the dispenser subassembly when the container and the dispenser subassembly are assembled together. Engagement of the actuating element with the dispenser subassembly is a prerequisite for operating the pump and dispensing liquid from the liquid dispenser. The actuating element urges the pump into the first charged position for drawing liquid from the container and into the pump. --

Column 1,
Line 62, delete "is".

Column 3,
Line 12, delete "is".

Column 8,
Line 43, delete "is".

Column 10,
Line 36, "clement" should read -- element --.

Column 13,
Line 49, "lousing" should read -- housing --.

Column 14,
Line 1, delete "is".
Line 52, delete "is".

UNITED STATES PATENT AND TRADEMARK OFFICE
CERTIFICATE OF CORRECTION

PATENT NO. : 6,364,172 B1
DATED : April 2, 2002
INVENTOR(S) : Wilhelmus Johannes Maas and Petrus Lambertus Hurkmans It is certified that error appears in the above-identified patent and that said Letters Patent is hereby corrected as shown below:

Column 15,
Line 23, delete "is".

Column 16,
Line 61, "with in" should read -- within --.
Line 64, "n hery" should read -- periphery --.
Line 65, "secure" should read -- secured to --.
Line 66, after "slots" insert -- 172 --.

Column 20,
Line 57, delete "is".

Column 27,
Line 4, "arc" should read -- are --.

Column 28,
Line 20, "arc" should read -- are --.

Column 30,
Line 4, "11" should read -- 1 --.

Signed and Sealed this

First Day of October, 2002

Attest:

JAMES E. ROGAN
Attesting Officer
Director of the United States Patent and Trademark Office